(12) United States Patent
Sasaki et al.

(10) Patent No.: US 7,433,111 B2
(45) Date of Patent: Oct. 7, 2008

(54) ELECTROOPTIC MODULATION ELEMENT

(75) Inventors: Aiichirou Sasaki, Tokyo (JP); Mitsuru Shinagawa, Tokyo (JP)

(73) Assignee: Nippon Telegraph and Telephone Corporation (JP)

( * ) Notice: Subject to any disclaimer, the term of this patent is extended or adjusted under 35 U.S.C. 154(b) by 105 days.

(21) Appl. No.: 10/523,122

(22) PCT Filed: Jun. 9, 2004

(86) PCT No.: PCT/JP2004/008384

§ 371 (c)(1),
(2), (4) Date: Jan. 27, 2005

(87) PCT Pub. No.: WO2004/111710

PCT Pub. Date: Dec. 23, 2004

(65) Prior Publication Data

US 2006/0051019 A1    Mar. 9, 2006

(30) Foreign Application Priority Data

Jun. 10, 2003 (JP) ............................. 2003-165497
Nov. 10, 2003 (JP) ............................. 2003-380434
Apr. 6, 2004 (JP) ............................. 2004-111861

(51) Int. Cl.
*G02F 1/03* (2006.01)
*G02F 1/07* (2006.01)
(52) U.S. Cl. .................... 359/256; 359/254; 359/247
(58) Field of Classification Search .................. 359/256
See application file for complete search history.

(56) References Cited

U.S. PATENT DOCUMENTS

| 3,980,962 | A |   | 9/1976 | Scotter |
| 4,866,406 | A |   | 9/1989 | Minakata et al. |
| 4,929,050 | A |   | 5/1990 | Wilson |
| 5,493,426 | A | * | 2/1996 | Johnson et al. ............... 349/74 |
| 5,526,169 | A |   | 6/1996 | Kikuchi et al. |
| 5,552,912 | A | * | 9/1996 | Sharp et al. ................. 349/117 |
| 5,617,203 | A | * | 4/1997 | Kobayashi et al. ....... 356/237.5 |
| 6,044,190 | A |   | 3/2000 | Kashyap |

FOREIGN PATENT DOCUMENTS

| EP | 0603747 A | 10/1997 |
| EP | 0 877 968 B | 9/2000 |
| JP | 49-114436 A | 10/1974 |
| JP | 52-17845 | 2/1977 |
| JP | 60-169824 | 9/1985 |
| JP | 62-198824 A | 9/1987 |
| JP | 63-307427 A | 12/1988 |
| JP | 04-204815 A | 7/1992 |
| JP | 4-294319 | 10/1992 |
| JP | 06-160788 A | 6/1994 |
| JP | 06-289347 A | 10/1994 |

(Continued)

*Primary Examiner*—Jessica T Stultz
(74) *Attorney, Agent, or Firm*—Kilpatrick Stockton LLP

(57) ABSTRACT

On one pair of opposed side faces (1*a*, 1*b*) of electro-optic crystal (1), grooves (3*a*, 3*b*) are formed so as to make bottom faces of the grooves approach each other and make a distance between the bottom faces shorter than a predetermined distance, and the pair of electrodes (5*a*, 5*b*) are formed in the grooves (3*a*, 3*b*) so as to fill the grooves nearly completely.

4 Claims, 21 Drawing Sheets

FOREIGN PATENT DOCUMENTS

| | | |
|---|---|---|
| JP | 07-146413 A | 6/1995 |
| JP | 11-002787 A | 1/1999 |
| JP | 11-218627 A | 8/1999 |
| JP | H11-218627 | 8/1999 |
| JP | 2000-66159 | 3/2000 |
| JP | 2000-504124 | 4/2000 |
| JP | 2000-504124 A | 4/2000 |
| JP | 2000-171488 | 6/2000 |
| JP | 2000-321455 A | 11/2000 |
| JP | 2001-154047 A | 6/2001 |
| JP | 2001-249235 A | 9/2001 |
| JP | 2003-098204 A | 3/2003 |
| JP | 2003-098205 A | 4/2003 |
| JP | 2003-270597 A | 9/2003 |
| JP | 2006-160788 | 6/2006 |
| JP | 2006-289347 | 10/2006 |

* cited by examiner

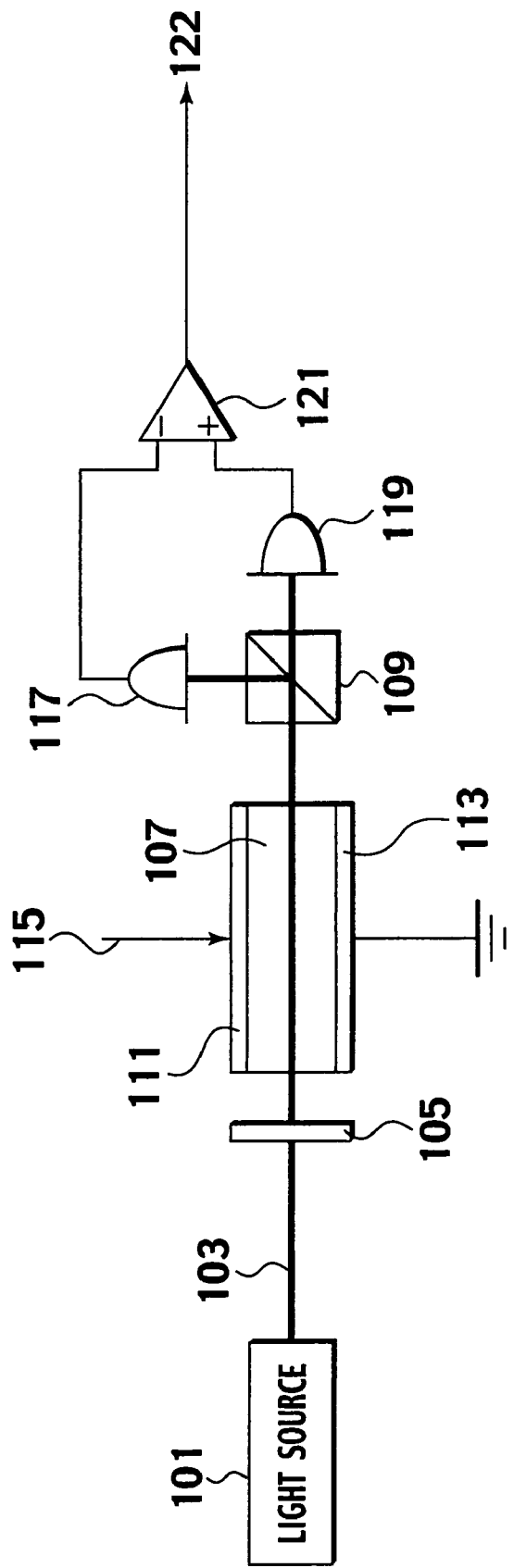

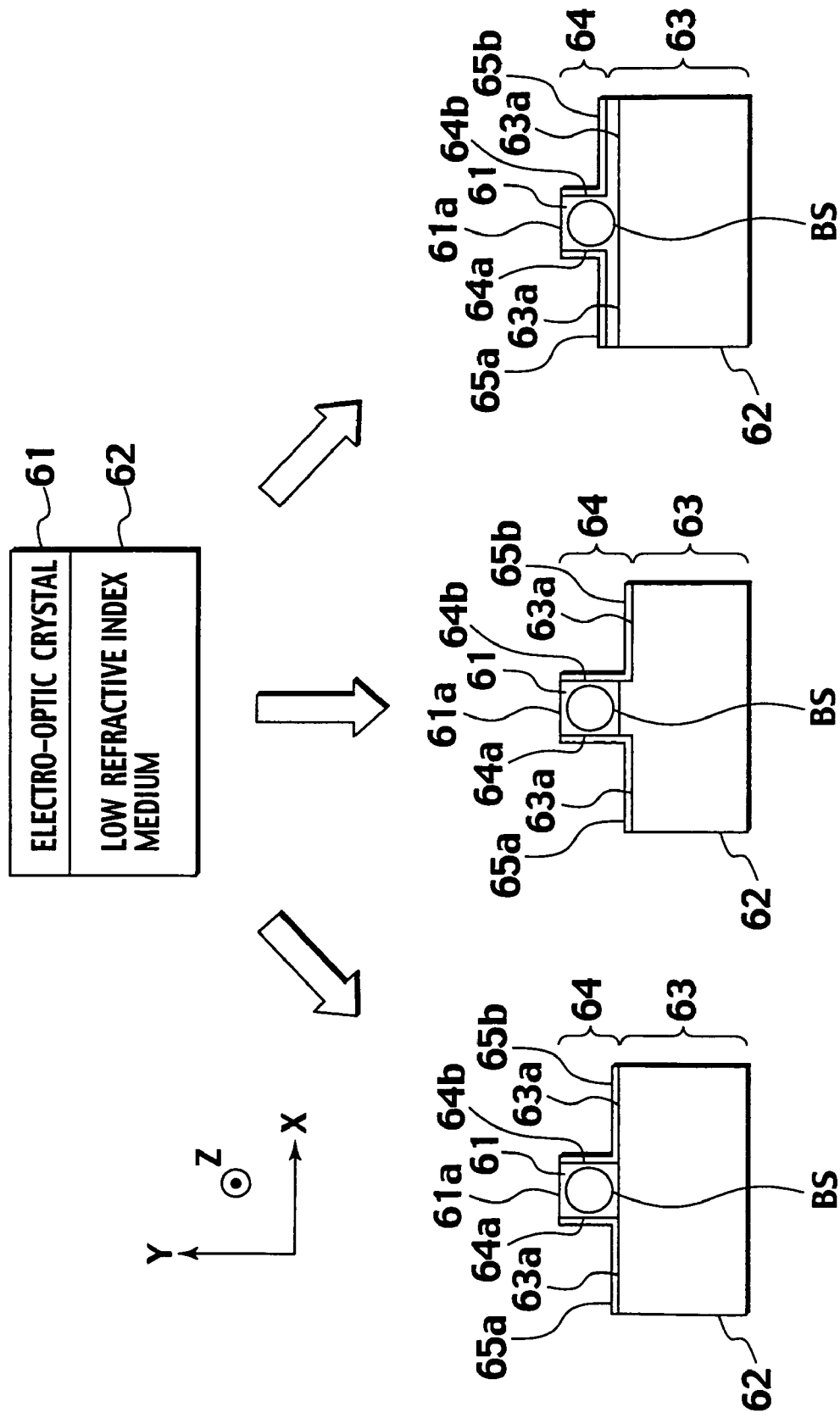

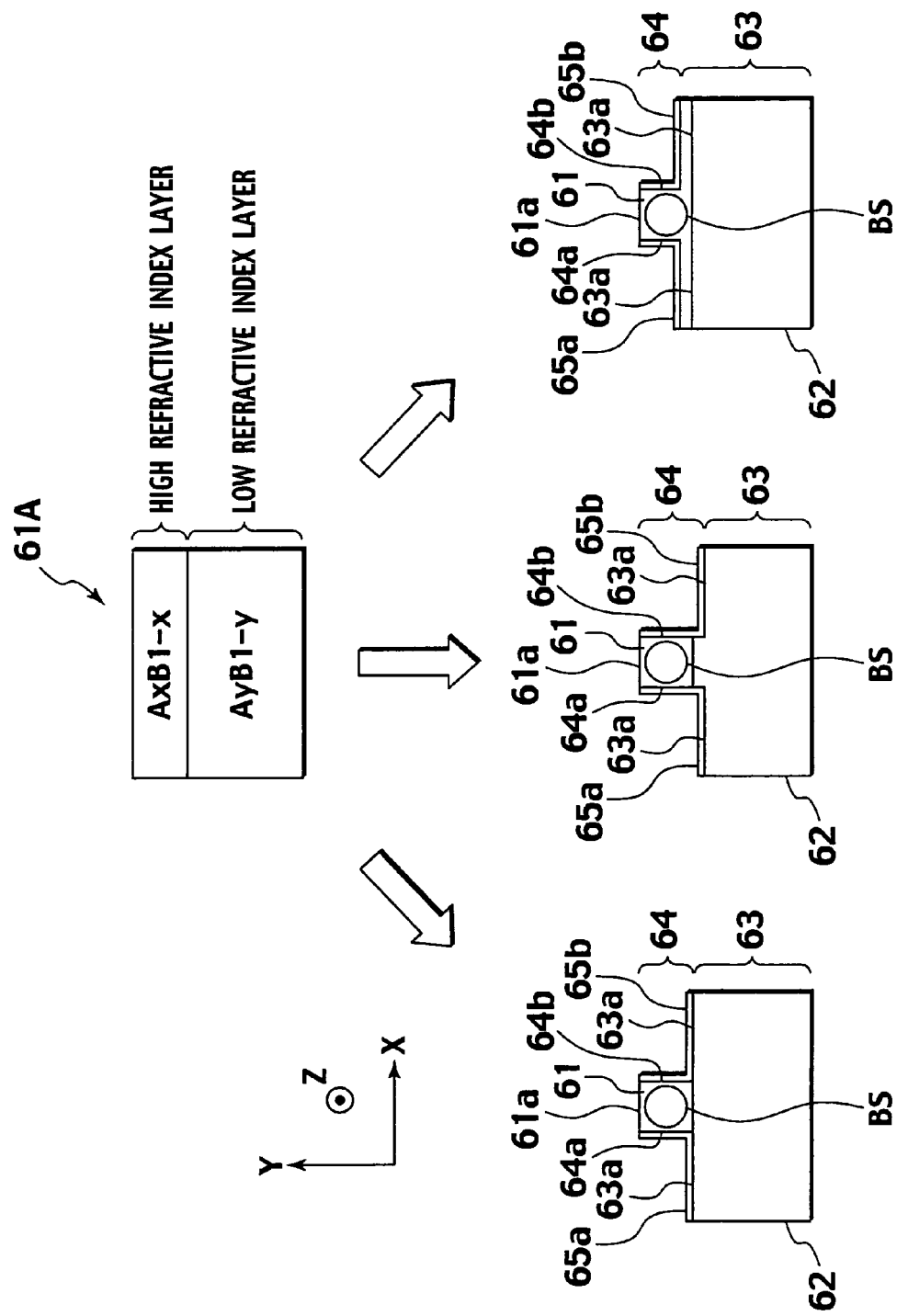

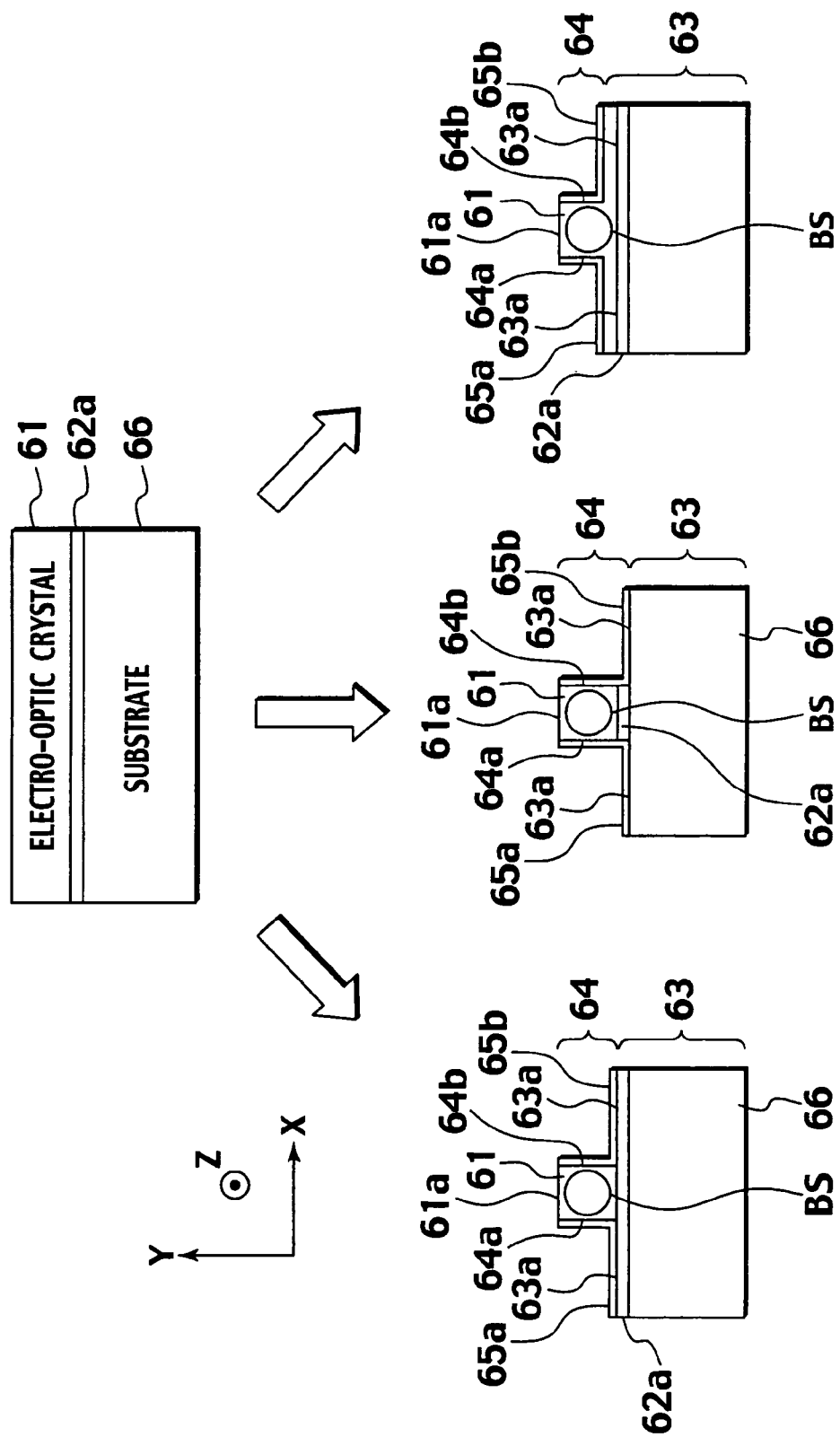

ELECTRO-OPTIC CRYSTAL HAVING CAVITY

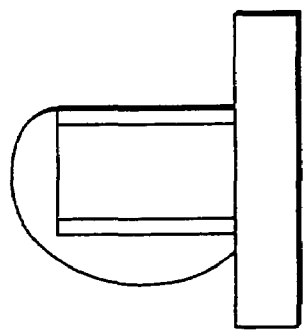
FIG.18A
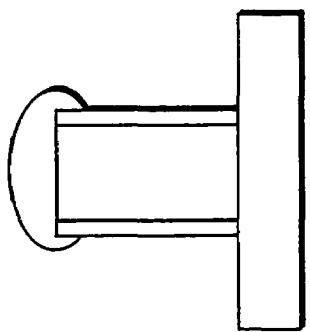
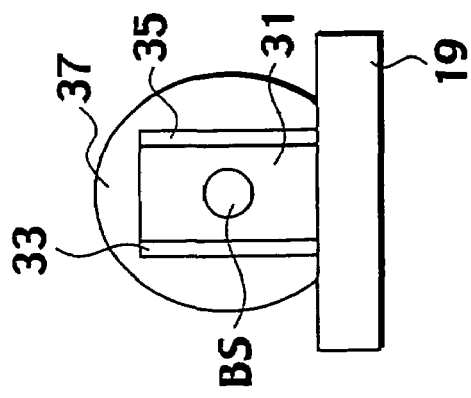
FIG.18B
FIG.18C
FIG.18D
FIG.18E

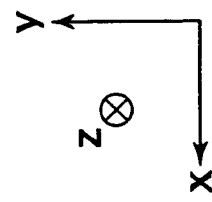
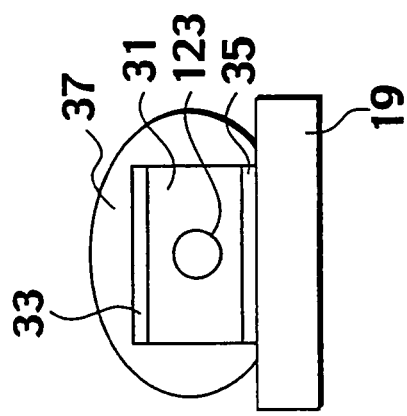
FIG.20A
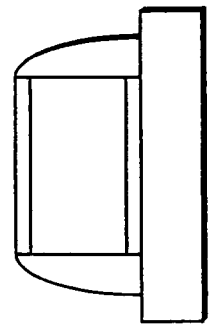
FIG.20B
FIG.20C
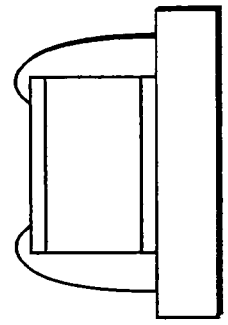
FIG.20D
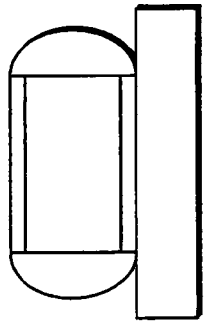
FIG.20E

ELECTROOPTIC MODULATION ELEMENT

This application is a national phase application under 35 U.S.C. §371 of International Application No. PCT/JP04/08384, filed Jun. 9, 2004, which claims priority to JP 2003-165497, filed in Japan on Jun. 10, 2003, JP 2003-380434, filed in Japan on Nov. 10, 2003, and JP 2004-111861, filed in Japan on Apr. 6, 2004.

TECHNICAL FIELD

The present invention relates to an electro-optic modulation device that includes electro-optic (EO) crystal having an variable birefringence index according to a coupled electric field, and one pair of electrodes disposed so as to have the electro-optic crystal interposed therebetween to couple the electric field to the electro-optic crystal, and that changes polarization of light incident between the one pair of electrodes according to a change of the birefringence index depending upon a strength of electric field coupled via the one pair of electrodes. In particular, the present invention relates to an electro-optic modulation device improved in modulation efficiency and sensitivity and flattened in frequency characteristics without hampering the strength and increasing the size.

BACKGROUND ART

An electro-optic modulation device using electro-optic crystal is used as an electro-optic modulator which modulates the phase of light passed through the crystal according to the magnitude of the electric field generated between electrodes, or as an electric-field sensor for conversely detecting a phase change of light passed through the crystal and thereby detecting the electric field between the electrodes or an electric signal.

For example, in the electric-field sensor, an optical beam is incident on electro-optic crystal with AC electric field applied thereto and light emitted from the electro-optic crystal is separated into S-polarized light and P-polarized light by a polarizing-beam splitter (hereafter referred to as PBS). The polarized lights are detected respectively and independently by two photodetectors (hereafter referred to as PD), and a difference between intensities of the S-polarized light and the P-polarized light is detected by the PD and a differential amplifier.

FIG. 1 is a diagram showing operation of a conventional electric-field sensor.

An optical beam emitted from a light source 101 is transmitted through a phase compensator 105 and electro-optic crystal 107, and then incident on a PBS 109. The polarization state of the optical beam 103 is adjusted by the phase compensator 105 so as to become circularly polarized light immediately before incidence on the PBS 109. An electric field depending on a signal 115 to be measured is applied to the electro-optic crystal 107 via a signal electrode 111 and a ground electrode 113. The optical beam 103 is subjected to polarization modulation in the electro-optic crystal 107 according to the electric field. The polarized modulated light is separated into an S-polarized component and a P-polarized component by the PBS 109. At this time, each polarized component has already been converted to intensity modulated light. The intensity modulated S-polarized component and P-polarized light change in phases opposite to each other. Accordingly, by receiving light in PDs 117 and 119 and conducting differential signal detection in a differential amplifier 121, therefore, it becomes possible to obtain an output signal 122 having a higher signal-to-noise ratio (see, for example, Japanese Patent Application Laid-Open Nos. 2003-98205, 2003-98204 and 2000-171488).

The electro-optic modulation device using electro-optic crystal begins to be applied to communication between wearable computers using a living body as a signal path. In other words, by inducing electric field in a receiver in a wearable computer of communication destination via the living body and detecting the electric field by using an electro-optic technique, communication that does not depend upon the positional relation between the ground of the wearable computer and the earth ground to the utmost, that is communication with a wearable computer that is in an arbitrary position on the living body, can be certainly implemented.

FIGS. 2A to 2C are diagrams to explain a process for fabricating an electro-optic modulation device by using electro-optic crystal.

An electro-optic modulation device including electro-optic crystal and a pair of electrodes is formed by working thinly electro-optic crystal 107a of a raw material as shown in FIG. 2A to form a thin electro-optic crystal 107 as shown in FIG. 2B, and forming a pair of electrodes 111 and 113 on a pair of opposite side faces of the electro-optic crystal 107 worked to become thin. By the way, an electro-optic crystal 101a thus worked to become thin has a thickness d of approximately 0.1 mm.

As communication using a living body as the transmission path, several modes are conceivable. As representative modes, two modes such as communication between an installation type terminal and a portable terminal, and communication between portable terminals are conceivable.

In the communication between an installation type terminal and a portable terminal, communication can be conducted in a comparatively stable state since the installation type is connected to the earth ground. On the other hand, in the communication between portable terminals, communication is conducted in an extremely unstable state since neither of the terminals is grounded. Furthermore, battery drive is conducted typically and low power consumption is demanded. Therefore, conditions imposed on a receiver to establish communication in such a state are high sensitivity and flatness in the frequency characteristics of the sensitivity.

First studying the sensitivity, a phase change ($\Delta\phi$) given to light by the electro-optic modulation device is given by the following expression.

$$\Delta\phi = \alpha \cdot (V/d) \cdot L$$

Here, $\alpha$ is a constant depending upon the kind of the electro-optic crystal and the structure of the device, V is a voltage applied to the electrodes, d is a distance between the electrodes, and L is a length of the electro-optic modulation device. As represented by the expression, a greater phase change can be given to light as d becomes small and L becomes large. In other words, the modulation efficiency becomes high as an electro-optic modulator, and the sensitivity is improved as an electric-field sensor.

In order to shorten the distance between the pair of electrodes to the utmost, it is necessary to work the electro-optic crystal to make it thin. In the conventional technique, however, there is a problem that it is extremely difficult to generate a device using thin crystal having a thickness of mm order or less and the electro-optic crystal becomes apt to break.

It is desirable to apply antireflection coating to an end face of the electro-optic crystal on which light is incident. However, there is a problem that it becomes difficult to apply the antireflection coating if the electro-optic crystal is made thin.

From a different point of view, the sensitivity of the electro-optic modulation device serving as an electric-field sensor can be improved by lengthening the length of the electro-optic crystal in a light passage direction as described above. If the electro-optic modulation device is provided with a specific structure in order to increase the intensity by making the electro-optic crystal thin, then a phenomenon that light does not emit from the end face of the electro-optic crystal and light leaks in a side face direction because of light diffraction as the length is made longer is caused, resulting in a lowered modulation efficiency or a lowered sensitivity.

As for the flatness of the frequency characteristics which is the second demand, the following fact poses a problem. That is, in the electro-optic crystal with electric field applied thereto, the birefringence index of the crystal with respect to light is changed by deformation of the electron cloud and crystal lattice. The degree of the deformation of the electron cloud does not depend on the frequency of the applied electric field, however, the degree of the deformation of the crystal lattice depends upon the frequency. In the band of kHz to MHz order, therefore, the frequency characteristics of the sensitivity of the electro-optic crystal do not become flat in general. The reason why the frequency characteristics of the electro-optic crystal do not become flat is specifically that the eigenmode of the elastic vibration is caused depending upon the size and shape of the crystal.

In view of these problems, the present invention has been achieved. An object of the present invention is to provide an electro-optic modulation device capable of improving the modulation efficiency and sensitivity.

In particular, an object of the present invention is to provide an electro-optic modulation device capable of improving the modulation efficiency and sensitivity without hampering the strength of the device and causing a leak of light due to diffraction even when the gap between the pair of electrodes is made narrow.

Further, more specifically, an object of the invention is to provide an electro-optic modulation device which has flatness in the frequency characteristic.

DISCLOSURE OF THE INVENTION

In order to achieve the objects, a spirit of invention according to a first aspect is an electro-optic modulation device that includes electro-optic crystal having a birefringence index changed by a coupled electric field, and one pair of electrodes disposed so as to have the electro-optic crystal interposed therebetween to couple the electric field to the electro-optic crystal, and that changes polarization of light incident between the one pair of electrodes according to a change of the birefringence index depending upon a strength of electric field coupled via the one pair of electrodes, wherein the electro-optic crystal includes grooves parallel to a direction of the incident light respectively on one pair of side faces parallel to the direction, and consequently a thin crystal portion sandwiched between the grooves serves as a portion for coupling the electric field, and the one pair of electrodes are formed so as to fill the grooves, respectively.

In accordance with a spirit of invention according to a second aspect, the grooves are formed on the one pair of side faces so as to range from one to the other of end faces through which light is incident or emitted, in the invention according to the first aspect.

In accordance with a spirit of invention according to a third aspect, the grooves are formed in only a central portion except end portions between the end faces through which light is incident or emitted, in the one pair of side faces, in the invention according to the first aspect.

In order to achieve the objects, a spirit of invention according to a fourth aspect is an electro-optic modulation device that includes electro-optic crystal having a birefringence index changed by a coupled electric field, and one pair of electrodes disposed so as to have the electro-optic crystal interposed therebetween to couple the electric field to the electro-optic crystal, and that changes polarization of light incident between the one pair of electrodes according to a change of the birefringence index depending upon a strength of electric field coupled via the one pair of electrodes, wherein the electro-optic crystal includes grooves parallel to a direction of the incident light respectively on one pair of side faces parallel to the direction, and consequently a thin crystal portion sandwiched between the grooves serves as a portion for coupling the electric field, the one pair of electrodes are formed in bottom portions of the grooves so as to have a predetermined thickness, and at least remaining portions of the grooves except the one pair of electrode portions are filled with insulators.

In accordance with a spirit of invention according to a fifth aspect, the grooves are formed on the one pair of side faces so as to range from one to the other of end faces through which light is incident or emitted, in the invention according to the fourth aspect.

In accordance with a spirit of invention according to a sixth aspect, the grooves are formed in only a central portion except end portions between the end faces through which light is incident or emitted, in the one pair of side faces, in the invention according to the fourth aspect.

In accordance with a spirit of invention according to a seventh aspect, remaining portions of the grooves except the one pair of electrode portions are filled with insulators, and a whole of portions except the end faces through which light is incident or emitted is covered by further insulators, in the invention according to the fourth to sixth aspects.

In accordance with a spirit of invention according to an eighth aspect, the insulators are wax, in the invention according to the fourth to seventh aspects.

In order to achieve the objects, a spirit of invention according to a ninth aspect is an electro-optic modulation device that includes electro-optic crystal having a birefringence index changed by a coupled electric field, and one pair of electrodes disposed so as to have the electro-optic crystal interposed therebetween to couple the electric field to the electro-optic crystal, and that changes polarization of light incident between the one pair of electrodes according to a change of the birefringence index depending upon a strength of electric field coupled via the one pair of electrodes, the electro-optic modulation device including a base portion, and a ridge-shaped ridge portion projected on one side face of the base portion and extended in a direction of the incident light, at least a part of the ridge portion including the electro-optic crystal, the ridge portion having a width equivalent to a predetermined value or less, wherein the one pair of electrodes are formed on one pair of side faces opposed in a width direction of the ridge portion.

In accordance with a spirit of invention according to a tenth aspect, the ridge portion is formed nearly in the center on the one side face of the base portion when seen from the direction of the light incidence, in the invention according to the ninth aspect.

In accordance with a spirit of invention according to an eleventh aspect, the ridge portion is formed on an end on the one side face of the base portion when seen from the direction of the light incidence, in the invention according to the ninth aspect.

In accordance with a spirit of invention according to a twelfth aspect, the electro-optic modulation device further includes an insulator which covers the whole, in the invention according to the ninth aspect.

In accordance with a spirit of invention according to a thirteenth aspect, the electro-optic modulation device further includes an insulator which covers the ridge portion, in the invention according to the ninth aspect.

In accordance with a spirit of invention according to a fourteenth aspect, the electro-optic modulation device further includes an insulator which covers a top surface of the ridge portion and side faces of the one pair of electrodes forming faces continuous to the top surface, in the invention according to the ninth aspect.

In accordance with a spirit of invention according to a fifteenth aspect, the insulator includes wax, in the invention according to the twelfth to fourteenth aspects.

In accordance with a spirit of invention according to a sixteenth aspect, the electro-optic modulation device includes a low refractive index medium having a refractive index which is lower than a refractive index of the electro-optic crystal, at least near a side face of the ridge portion located on the base side and included in one pair of side faces other than the one pair of side faces on which the one pair of electrodes are formed, in the invention according to the ninth aspect.

In accordance with a spirit of invention according to a seventeenth aspect, the ridge portion includes the electro-optic crystal, and the base portion includes the low refractive index medium, in the invention according to the sixteenth aspect.

In accordance with a spirit of invention according to a eighteenth aspect, the ridge portion and an upper part of the base portion include the electro-optic crystal, and a remaining lower part of the base portion includes the low refractive index medium, in the invention according to the sixteenth aspect.

In accordance with a spirit of invention according to a nineteenth aspect, the base portion and a lower part of the ridge portion include the low refractive index medium, and a remaining upper part of the ridge portion includes the electro-optic crystal, in the invention according to the sixteenth aspect.

In accordance with a spirit of invention according to a twentieth aspect, the low refractive index medium is electro-optic crystal which includes chemical elements of the same kinds as those of the electro-optic crystal, but which is lower in refractive index on the basis of a difference in composition ratio, in the invention according to the seventeenth to nineteenth aspects.

In accordance with a spirit of invention according to a twenty-first aspect, the ridge portion includes the electro-optic crystal, an upper part of the base portion includes an adhesive agent, and a remaining lower part of the base portion includes a substrate, in the invention according to the sixteenth aspect.

In accordance with a spirit of invention according to a twenty-second aspect, the ridge portion and an upper part of the base portion include the electro-optic crystal, a lower part of the electro-optic crystal of the base portion includes an adhesive agent, and a remaining lower part of the base portion includes a substrate, in the invention according to the sixteenth aspect.

In accordance with a spirit of invention according to a twenty-third aspect, the base portion includes a substrate, a lower part of the ridge portion includes an adhesive agent, and a remaining upper part of the ridge portion includes the electro-optic crystal, in the invention according to the sixteenth aspect.

In accordance with a spirit of invention according to a twenty-fourth aspect, the low refractive index medium includes gas or a vacuum state in a cavity provided in an upper part of the base portion, in the invention according to the sixteenth aspect.

In accordance with a spirit of invention according to a twenty-fifth aspect, the ridge portion includes the electro-optic crystal, and the base portion includes photonic crystal having a periodic structure, in the invention according to the ninth aspect.

In order to achieve the objects, a spirit of invention according to a twenty-sixth aspect is an electro-optic modulation device that includes electro-optic crystal having a birefringence index changed by a coupled electric field, and one pair of electrodes disposed so as to have the electro-optic crystal interposed therebetween to couple the electric field to the electro-optic crystal, and that changes polarization of light incident between the one pair of electrodes according to a change of the birefringence index depending upon a strength of electric field coupled via the one pair of electrodes, the electro-optic modulation device further including an insulator applied so as to relatively fix the electro-optic crystal and the one pair of electrodes, except end faces through which light is incident or emitted.

In accordance with a spirit of invention according to a twenty-seventh aspect, the insulator includes a matter that has viscosity and a property of becoming hard with the lapse of time, in the invention according to the twenty-sixth aspect.

BRIEF DESCRIPTION OF THE DRAWINGS

FIG. 1 is a diagram explaining operation of a conventional electric-field sensor.

FIG. 13 is a diagram showing a plane of light incidence of an electro-optic modulation device according to an embodiment of ridge type.

FIG. 15 is a diagram showing a plane of light incidence of an electro-optic modulation device according to another embodiment of ridge type.

FIG. 16 is a diagram showing a plane of light incidence of an electro-optic modulation device according to another embodiment of ridge type.

FIGS. 18A to 18E are diagrams showing how wax is applied to electro-optic crystal placed longitudinally on a pedestal.

FIGS. 20A to 20E are diagrams showing how wax is applied to electro-optic crystal placed laterally on a pedestal.

BEST MODE FOR CARRYING OUT THE INVENTION

Hereafter, embodiments of the present invention will be described with reference to the drawings.

Figure 3A:
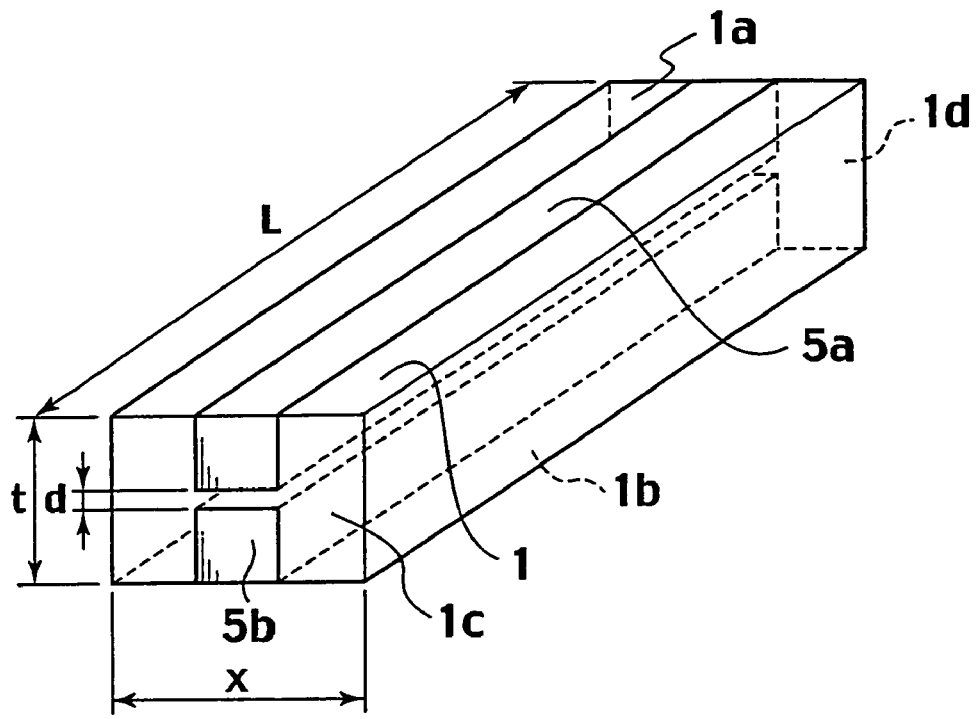
FIGS. 3A and 3B are respectively a partial perspective oblique view and a sectional view showing an electro-optic modulation device according to an embodiment of the present invention.
Figure 3B:
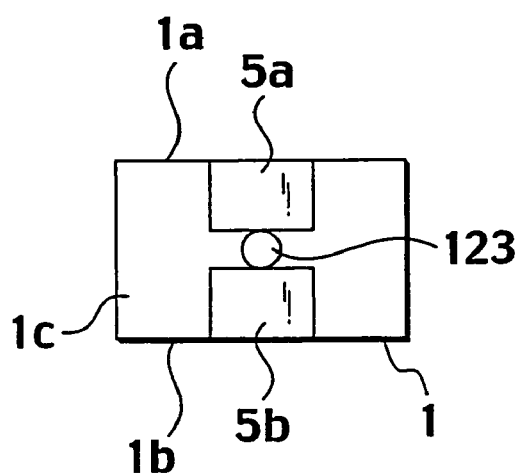

FIGS. 3A and 3B are respectively a partial perspective oblique view and a sectional view showing an electro-optic modulation device according to an embodiment of the present invention.

The electro-optic modulation device according to the embodiment shown in FIGS. 3A and 3B includes electro-optic crystal 1 having a pair of grooves dug and formed in a side face 1a and a side face 1b opposite to the side face 1a in their longitudinal direction so as to extend from an end face 1c to an end face 1d, and a pair of electrodes 5a and 5b formed of metal embedded in the pair of grooves. By the way, as shown in FIG. 3B, each of the pair of grooves has a rectangular sectional shape, and each of the pair of electrodes 5a and 5b buries its groove nearly completely. In other words, as shown in FIG. 3B, the electro-optic modulation device according to the present embodiment has a rectangular sectional shape, when the electro-optic crystal 1 and the pair of electrodes 5a and 5b are seen collectively. Furthermore, the electro-optic modulation device according to the present embodiment is sometimes called "H-type" on the basis of the sectional shape of the electro-optic crystal 1.

By the way, the pair of grooves are formed by, for example, digging both the side faces 1a and 1b by means of cutting or polishing so as to make bottoms approach each other in order to make a distance d between the pair of electrodes 5a and 5b equal to a predetermined distance or less. As for dimensions of the electro-optic modulation device thus formed, for example, the distance d between the electrodes 5a and 5b is 0.1 mm or less, the length L is approximately 2 cm, and dimensions t and x of the section respectively in the longitudinal and lateral directions are approximately 1 cm or less.

Even if the electro-optic modulation device having such a configuration is formed so as to have an extremely small distance d between the pair of electrodes 5a and 5b, the electrodes 5a and 5b are formed so as to nearly completely embed the grooves formed in the electro-optic crystal 1 as a whole and the thin crystal portion between the electrodes 5a and 5b is formed so as to be generally covered by the electrodes 5a and 5b and the electro-optic crystal 1. Therefore, the electro-optic crystal 1 is not easily broken from the thin portion between the electrodes 5a and 5b. In addition, the thin structure between the electrodes 5a and 5b is also formed by cutting or polishing the electro-optic crystal 1 of the raw material from both side faces 1a and 1b. Therefore, it is not difficult to conduct working so as to make the portion between the electrodes 5a and 5b extremely thin, for example, 0.1 mm or less.

As shown in FIG. 3B, a spot beam 123 is incident from an end face of the electro-optic crystal 1 between the electrodes 5a and 5b. As for antireflection coating on the plane of incidence as well, it can be conducted extremely easily and certainly by applying the antireflection coating to not only the end face of the thin crystal portion between the electrodes 5a and 5b, but also on an end face 1c of the whole rectangular electro-optic modulation device including the end face of the electro-optic crystal 1 except the thin crystal portion and end faces of the electrodes 5a and 5b.

Furthermore, the electrodes 5a and 5b, and the thin crystal portion between the electrodes 5a and 5b are fixed by the whole electro-optic crystal. These results in an effect that distortion of the thin crystal portion is suppressed and the frequency characteristics become flat. By the way, in the electro-optic modulation device having such a configuration, the direction of an electric-field vector generated by the electrodes 5a and 5b is perpendicular to the opposed planes of the electrodes 5a and 5b.

Figure 2A:
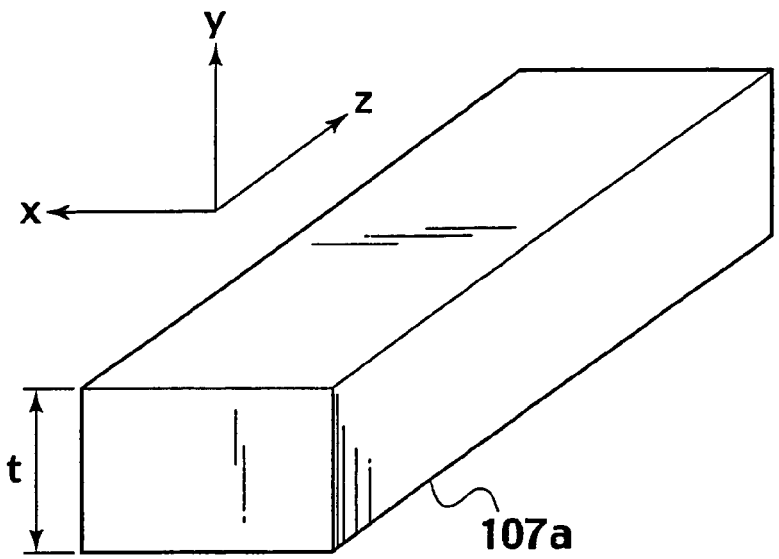
FIGS. 2A to 2C are diagrams for explain a process for fabricating an electro-optic modulation device by using electro-optic crystal.
Figure 2B:
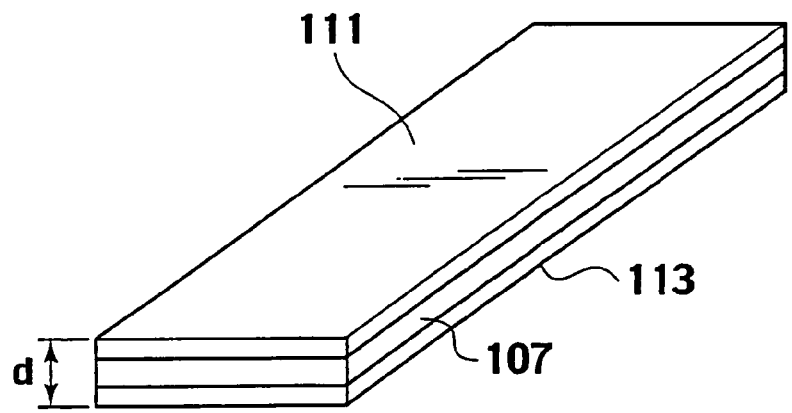
Figure 2C:
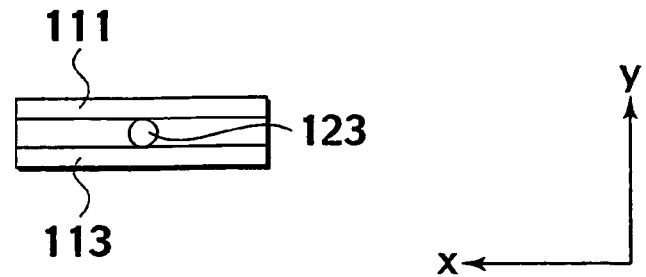
Figure 4A:
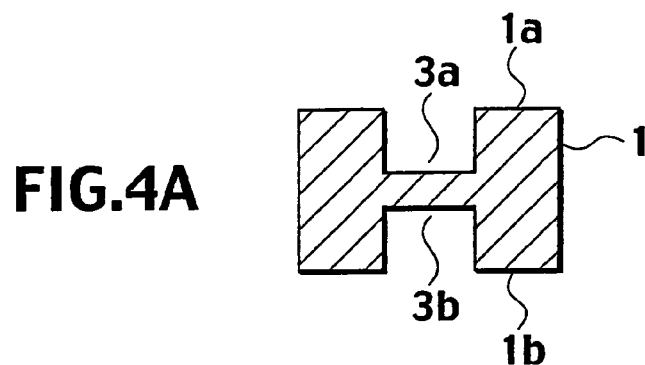
FIGS. 4A to 4D are diagrams showing a manufacture process of an electro-optic modulation device having a configuration shown in FIG. 3A.

A manufacture method of the electro-optic modulation device having the configuration shown in FIGS. 3A and 3B will now be described with reference to FIGS. 4A to 4D. In this electro-optic modulation device, for example, rectangular electro-optic crystal 1 of the raw material shown in FIG. 2A is first dug from its both side faces 1a and 1b by cutting or polishing to form two grooves 3a and 3b as shown in FIG. 4A.

Figure 4B:
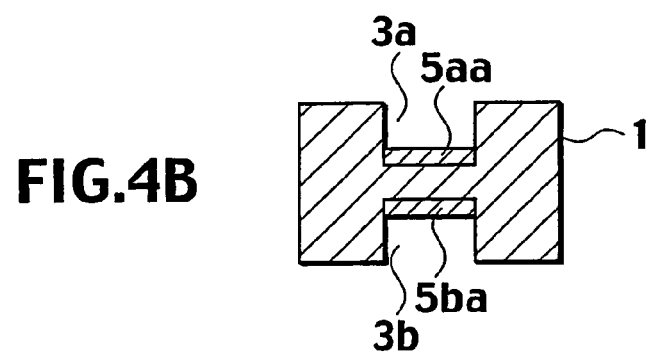
Figure 4C:
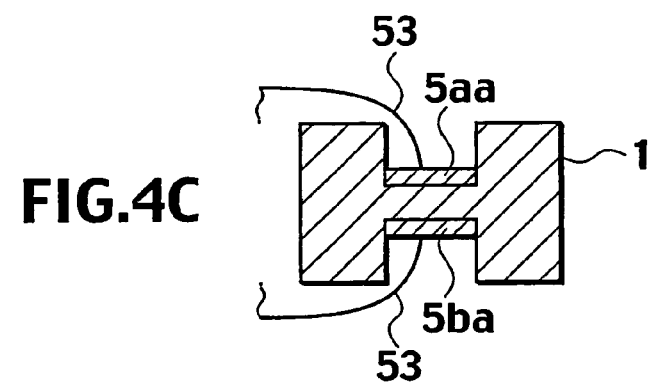
Figure 4D:
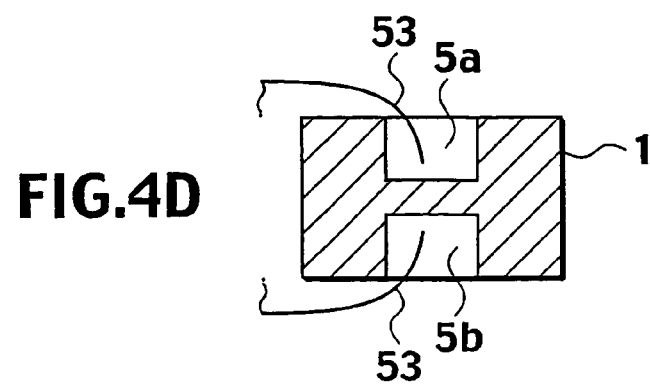

Then, metal such as silver paste is thinly applied to the grooves 3a and 3b as represented by characters 5aa and 5ba in FIG. 4B to form thin electrodes 5aa and 5ba. Subsequently, as shown in FIG. 4C, lead wires 53 for applying a voltage are adhered to the electrodes 5aa and 5ba.

As a result, the electro-optic modulation device is formed. In this example, however, the electrodes 5aa and 5ba have thin structures. In order to implement the electro-optic modulation device as shown in FIG. 3A and increase the strength, silver paste is further applied onto the electrodes 5aa and 5ba formed of silver paste to fill the gaps. As a result, an electrooptic modulation device including the electrodes 5a and 5b that are equal in thickness to those shown in FIG. 3A is completed.

Figure 5A:
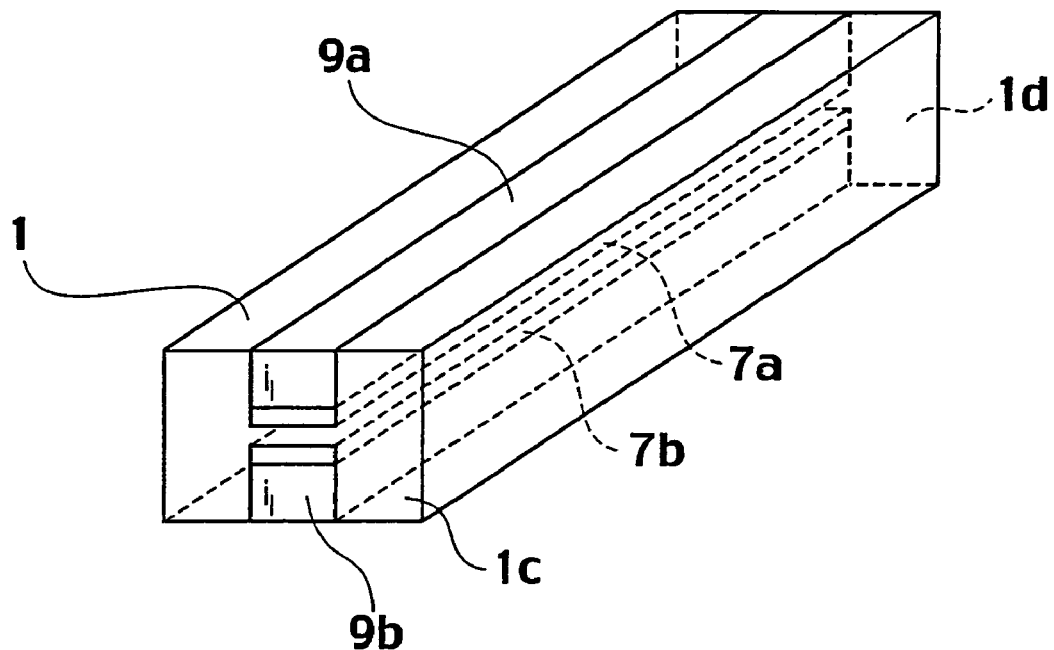
FIGS. 5A and 5B are respectively a partial perspective oblique view and a sectional view showing an electro-optic modulation device according to another embodiment of the present invention.
Figure 5B:
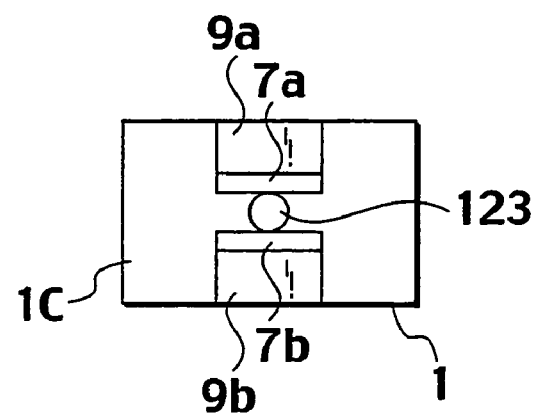

FIGS. 5A and 5B are respectively a partial perspective oblique view and a sectional view showing an electro-optic modulation device according to another embodiment of the present invention.

In the electro-optic modulation device according to the embodiment shown in FIGS. 5A and 5B, generally thin electrodes 7a and 7b having a thickness less than a predetermined thickness that is less than the depth of grooves are formed on bottoms in the grooves 3a and 3b, instead of the electrodes 5a and 5b generally formed in the grooves 3a and 3b in the electro-optic modulation device according to the embodiment shown in FIGS. 3A and 3B, and insulators 9a and 9b are formed so as to fill the grooves left above the thin electrodes 7a and 7b and thereby form the whole electro-optic modulation device as one body.

Even if the electro-optic modulation device having such a configuration is formed so as to have an extremely short distance between the pair of electrodes 7a and 7b, the electrodes 7a and 7b are formed so as to nearly completely fill the grooves 3a and 3b formed in the electro-optic crystal 1 as a whole in conjunction with the insulators 9a and 9b and generally cover the thin crystal portion between the electrodes 7a and 7b by the electrodes 7a and 7b, the insulators 9a and 9b and the electro-optic crystal 1. Therefore, the electro-optic crystal 1 is not broken easily from the thin portion of the electrodes 7a and 7b. In addition, since the thin crystal structure between the electrodes 7a and 7b respectively in the grooves 3a and 3b is also formed by digging the electro-optic crystal 1 of the raw material from both side faces 1a and 1b by means of cutting or polishing, it is not difficult to conduct working so as to make the portion between the electrodes 7a and 7b extremely thin, for example, 0.1 mm or less.

As shown in FIG. 5B, a spot beam 123 is incident from an end face of the electro-optic crystal 1 between the electrodes 7a and 7b. As for antireflection coating on the plane of incidence as well, it can be conducted extremely easily and certainly by applying the antireflection coating to not only the end face of the thin crystal portion between the electrodes 7a and 7b, but also on an end face 1c of the whole rectangular electro-optic modulation device including the end face of the electro-optic crystal 1 except the thin crystal portion and end faces of the electrodes 7a and 7b, and end faces of the insulators 9a and 9b.

Furthermore, the electrodes 7a and 7b, and the thin crystal portion between the electrodes 7a and 7b are fixed by the whole electro-optic crystal and the insulators 9a and 9b. These results in an effect that distortion of the thin crystal portion is suppressed and the frequency characteristics become flat. By the way, in the electro-optic modulation device having such a configuration, the direction of an electric-field vector generated by the electrodes 7a and 7b is perpendicular to the opposed planes of the electrodes 7a and 7b.

Figure 6A:
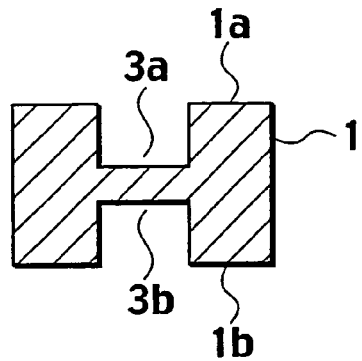
FIGS. 6A to 6D are diagrams showing a manufacture process of an electro-optic modulation device having a configuration shown in FIG. 5A.

A manufacture method of the electro-optic modulation device having the configuration shown in FIGS. 5A and 5B will now be described with reference to FIGS. 6A to 6D. In this electro-optic modulation device, for example, rectangular electro-optic crystal 1 of the raw material shown in FIG. 2A is first dug from its both side faces 1a and 1b by cutting or polishing to form two grooves 3a and 3b as shown in FIG. 6A.

Figure 6B:
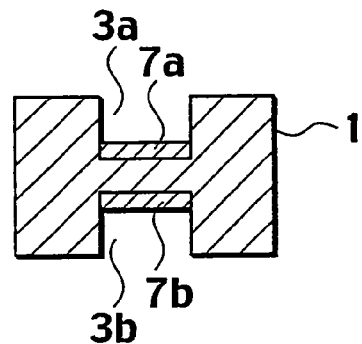
Figure 6C:
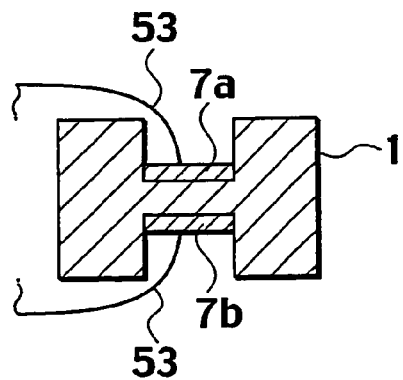

Then, a conductive material such as silver paste is thinly applied to the grooves 3a and 3b to form electrodes 7a and 7b as shown in FIG. 6B. Subsequently, as shown in FIG. 6C, lead wires 53 for applying a voltage are adhered to the electrodes 7a and 7b. By the way, the manufacture process is thus far the same as that shown in FIGS. 4A to 4C.

Figure 6D:
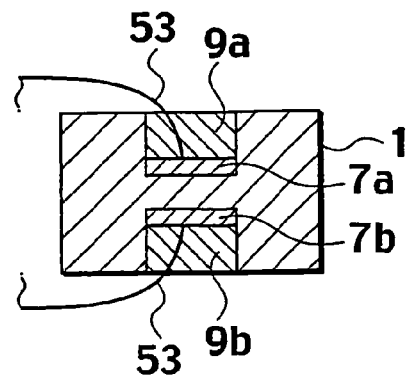

Subsequently, as shown in FIG. 6D, the grooves above the thin electrodes 7a and 7b having the lead wires 53 adhered thereto are filled with the insulators 9a and 9b, leaving no space. In order to fill the grooves leaving no space, for example, an adhesive agent is suitable as the insulators 9a and 9b.

Figure 7A:
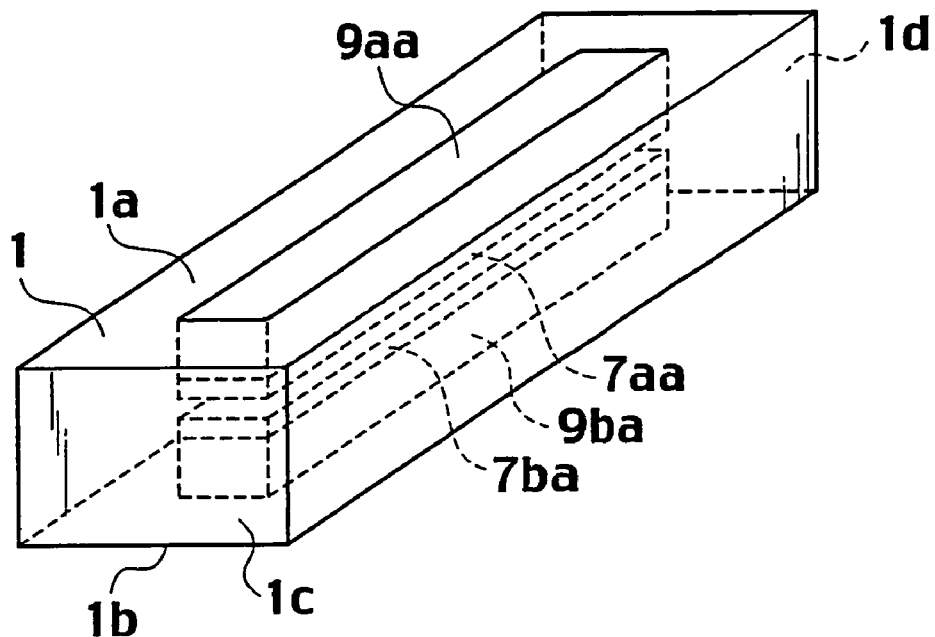
FIGS. 7A and 7B are respectively a partial perspective oblique view and a sectional view showing an electro-optic modulation device according to another embodiment of the present invention.
Figure 7B:
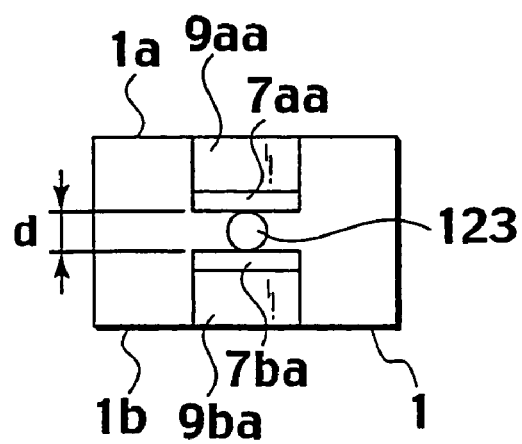

FIGS. 7A and 7B are respectively a partial perspective oblique view and a sectional view showing an electro-optic modulation device according to another embodiment of the present invention.

Instead of forming a sandwich structure including a pair of electrodes 7a and 7b, thin electro-optic crystal between the electrodes 7a and 7b, and the insulators 9a and 9b so as to extend from the end face 1c to the end face 1d in the electro-optic modulation device according to the embodiment shown in FIGS. 5A and 5B, the electro-optic modulation device according to the embodiment shown in FIGS. 7A and 7C is formed so as to have such a sandwich structure only in a central portion between the end face 1c and the end face 1d except end portions. In other words, instead of the grooves 3a and 3b in the embodiment shown in FIGS. 5A and 5B, concave portions 4a and 4b surrounded by the electro-optic crystal in their periphery are formed, and the sandwich structure is formed in the concave portions 4a and 4b. Other structures and operations are the same as those in the embodiment shown in FIGS. 5A and 5B.

Even if the electro-optic modulation device having such a configuration is formed so as to have an extremely small distance d between pair of electrodes 7aa and 7ba, the electrodes 7aa and 7ba are formed so as to nearly completely embed the concave portions 4a and 4b formed in the electro-optic crystal 1 as a whole in conjunction with insulators 9aa and 9ba and the thin crystal portion between the electrodes 7aa and 7ba is formed so as to be generally covered by the electrodes 7aa and 7ba, the insulators 9aa and 9ba, and the electro-optic crystal 1. Therefore, the electro-optic crystal 1 is not easily broken from the thin portion between the electrodes 7aa and 7ba. In addition, the thin structure between the electrodes 7aa and 7ba in the concave portions 4a and 4b is also formed by digging the electro-optic crystal 1 of the raw material from both side faces 1a and 1b by means of cutting or polishing. Therefore, it is not difficult to conduct working so as to make the distance d between the electrodes 7aa and 7ba extremely short, for example, 0.1 mm or less.

As shown in FIG. 7B, a spot beam 123 is incident on an end face of the electro-optic crystal 1 between the electrodes 7aa and 7ba from the end face of the electro-optic crystal 1 generally covering its outside. As for antireflection coating on the plane of incidence as well, it can be conducted extremely easily and certainly because the antireflection coating is conducted on the whole end face of the electro-optic crystal 1.

Furthermore, the electrodes 7aa and 7ba, and the thin crystal portion between the electrodes 7aa and 7ba are fixed by the whole electro-optic crystal and the insulators 9aa and 9ba. These results in an effect that distortion of the thin crystal portion is suppressed and the frequency characteristics become flat. By the way, in the electro-optic modulation device having such a configuration, the direction of an electric-field vector generated by the electrodes 7aa and 7ba is perpendicular to the opposed planes of the electrodes 7aa and 5ba.

Figure 8A:
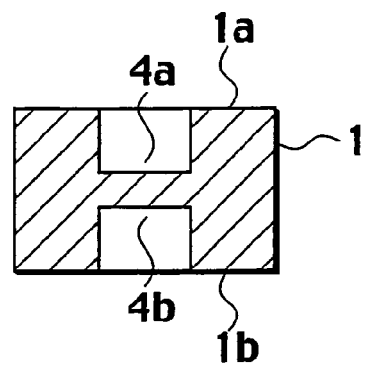
FIGS. 8A to 8D are diagrams showing a manufacture process of an electro-optic modulation device having a configuration shown in FIG. 7A.

A manufacture method of the electro-optic modulation device having the configuration shown in FIGS. 7A and 7B will now be described with reference to FIGS. 8A to 8D. Nearly in the same way as the manufacture method of the electro-optic modulation device shown in FIGS. 5A and 5B described with reference to FIGS. 6A to 6D, in this manufacture method, rectangular electro-optic crystal of the raw material is first dug from its both side faces 1*a* and 1*b* by cutting or polishing to form two concave portions 4*a* and 4*b* each taking the shape of a groove, as shown in FIG. 8A.

Figure 8B:
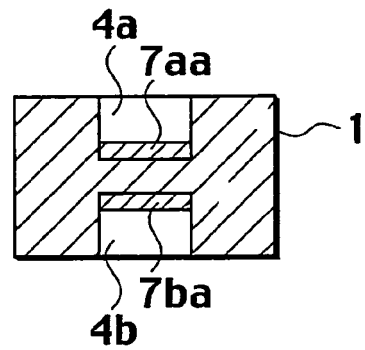
Figure 8C:
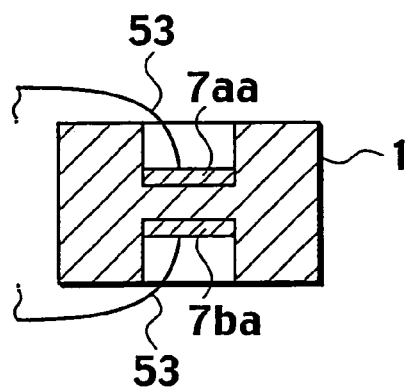

Then, a conductive material such as silver paste is thinly applied to the concave portions 4*a* and 4*b* to form electrodes 7*aa* and 7*ba* as shown in FIG. 8B. Subsequently, as shown in FIG. 8C, lead wires 53 for applying a voltage are adhered to the electrodes 7*aa* and 7*ba*.

Figure 8D:
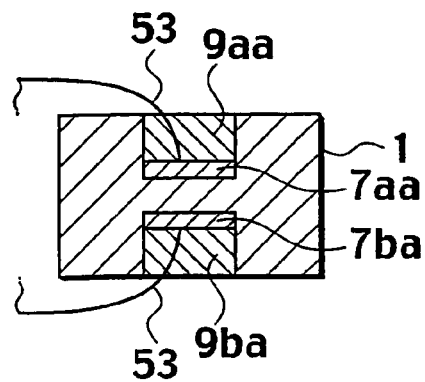

Subsequently, as shown in FIG. 8D, the concave portions above the thin electrodes 7*aa* and 7*ba* having the lead wires 53 adhered thereto are filled by the insulators 9*aa* and 9*ba*, leaving no space. In order to fill the grooves leaving no space, for example, an adhesive agent is suitable as the insulators 9*aa* and 9*ba*. As described above, the electro-optic modulation device shown in FIGS. 7A and 7B can be manufactured by using the same manufacture method as that of the electro-optic modulation device shown in FIGS. 5A and 5B except that the grooves are replaced by concave portions. In the concave portions 4*a* and 4*b* formed in the electro-optic crystal, however, it is not necessary that sides thereof are at right angles, but the sides may be inclined or curved as shown in FIGS. 9B and 9C and as described below.

Figure 9A:
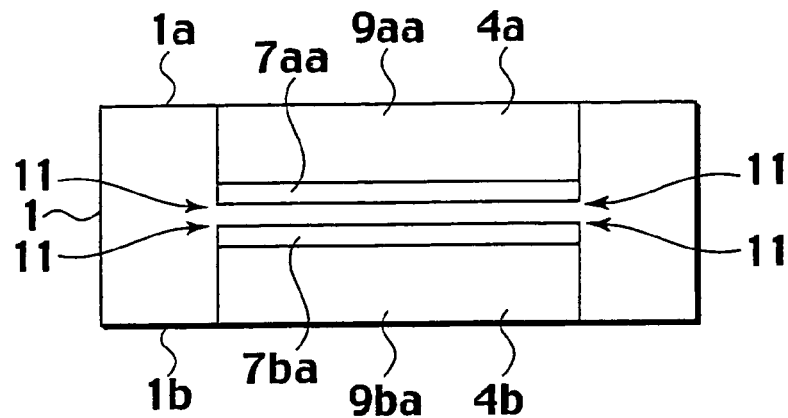
FIGS. 9A to 9C are a longitudinal sectional view of a structure of an electro-optic modulation device according to the embodiment shown in FIGS. 7A and 7B seen from a direction perpendicular to FIG. 7B, and longitudinal sectional views showing other structures of corner portions.

FIG. 9A is a longitudinal sectional view of the structure of the electro-optic modulation device according to the embodiment shown in FIGS. 7A and 7B seen from a direction perpendicular to FIG. 7B. As shown in FIG. 9A, all corner portions 11 of bottoms of the concave portions 4*a* and 4*b* having the pair of electrodes 7*aa* and 7*ba* and the insulators 9*aa* and 9*ba* embedded therein are formed nearly at right angles.

Figure 9B:
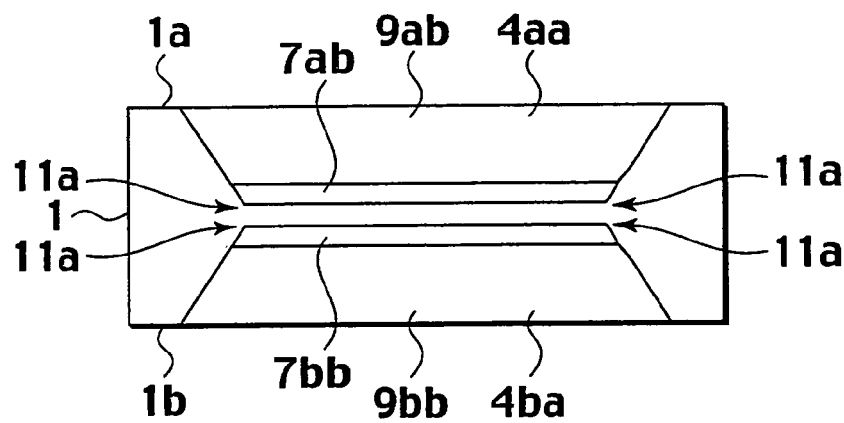
Figure 9C:
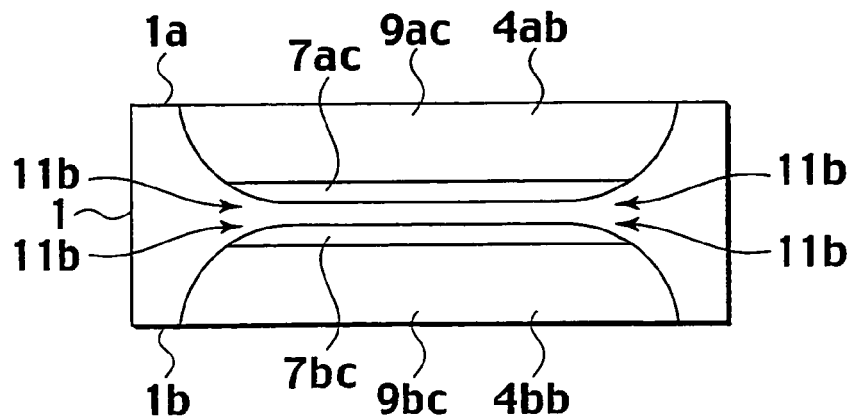

On the other hand, FIGS. 9B and 9C are longitudinal sectional views showing other structures of the corner portions. In the case of FIG. 9B, all corner portions on bottoms in the concave portions 4*aa* and 4*ba* are formed so as to be inclined at an obtuse angle which is larger than a right angle. In the case of FIG. 9C, all corner portions on bottoms in the concave portions 4*aa* and 4*ba* are formed so as to be curved round without being angular. In these cases as well, the concave portions may be filled with only a conductive material to form electrodes.

In the foregoing embodiments, the case where grooves are formed on both sides has been described. As a matter of course, however, a groove may be formed on only one side face.

FIGS. 10A to 10D are sectional views showing a manufacture process of an electro-optic modulation device according to another embodiment of the present invention.

Figure 10A:
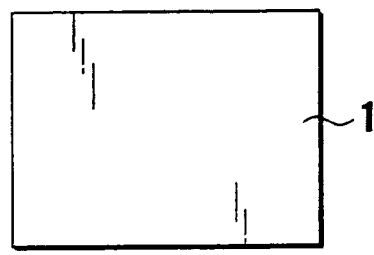
FIGS. 10A to 10D are sectional views showing a manufacture process of an electro-optic modulation device according to another embodiment of the present invention.
Figure 10B:
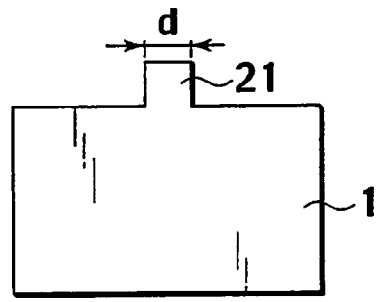
Figure 10C:
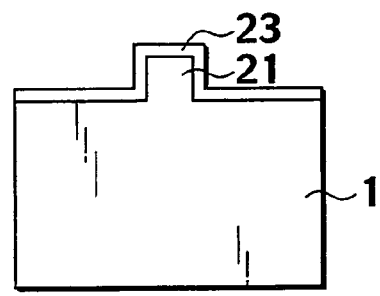
Figure 10D:
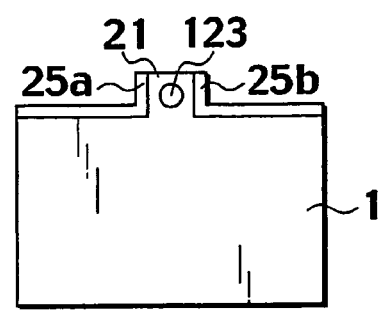

The electro-optic modulation device according to the embodiment shown in FIGS. 10A to 10D finally includes a ridge portion 21 formed on the top surface of the electro-optic crystal 1 so as to project with a predetermined width d or less, for example, with 0.1 mm or less, and a pair of electrodes 25*a* and 25*b* formed on a pair of side faces opposed to each other in the width direction of the ridge portion 21, as shown in FIG. 10D.

In order to manufacture the electro-optic modulation device having such a structure, the top surface of the electro-optic crystal 1 of the raw material shown in FIG. 10A is first cut or polished as shown in FIG. 10B to form the ridge portion 21 having a width equal to a predetermined width d or less, for example, 0.1 mm or less.

Then, as shown in FIG. 10C, metal 23 is deposited by evaporation or applied to the top surface of the electro-optic crystal 1 having the formed ridge portion 21. Subsequently, as shown in FIG. 10D, only the metal 23 deposited on the ridge portion 21 by evaporation is removed by polishing or the like. As a result, the pair of electrodes 25*a* and 25*b* are formed with metal left on both side faces of the ridge portion 21.

Even if the electro-optic modulation device having such a configuration is formed so as to have an extremely small distance d between the pair of electrodes 25*a* and 25*b*, the electrodes 25*a* and 25*b* are formed on the projected portion of the electro-optic crystal 1 which is large as a whole. Therefore, the electro-optic crystal between the electrodes 25*a* and 25*b* is not easily broken. In addition, the electrodes 25*a* and 25*b* are formed by conducting working and metal evaporation on the top surface of the electro-optic crystal 1. Therefore, it is not difficult to conduct working so as to make the distance d between the electrodes 25*a* and 25*b* located across the ridge portion 21 extremely thin, for example, 0.1 mm or less.

As shown in FIG. 10D, a spot beam 123 is incident from an end face of the electro-optic crystal 1 between the electrodes 25*a* and 25*b*. As for antireflection coating on the plane of incidence as well, it can be conducted extremely easily and certainly by applying the antireflection coating to not only the end face of the thin crystal portion between the electrodes 25*a* and 25*b*, but also on an end face of the whole electro-optic modulation device including the end face of the electro-optic crystal 1 formed as one body below the portion. By the way, in the electro-optic modulation device having such a configuration, the direction of an electric-field vector generated by the electrodes 25*a* and 25*b* is perpendicular to the opposed planes of the electrodes 25*a* and 25*b*.

As shown in FIG. 10D, only the metal 23 deposited on the ridge portion 21 by evaporation is removed by polishing or the like, and the pair of electrodes 25*a* and 25*b* are formed of the metal left on both side faces of the ridge portion 21. In this case, the metal 23 remains on the top surface of the electro-optic crystal 1 besides the side faces opposed to each other across the ridge portion 23, and this portion also acts as electrodes. However, undesired electric fields generated between electrodes of this portion are extremely few, and a large majority is generated between the opposed electrodes 25*a* and 25*b* on the ridge portion 21.

Figure 11:
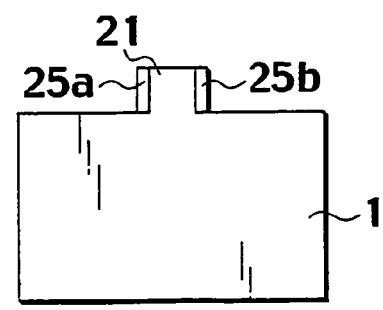
FIG. 11 is a diagram showing an electro-optic modulation device shown in FIG. 10D with electrodes formed of unnecessary metal remained on electro-optic crystal being removed.

If metal on the remaining portion is removed as shown in, for example, FIG. 11 in order to remove slight or unnecessary electric fields generated between electrodes formed on the portion of remaining metal, generation of such unnecessary electric fields can be avoided. On the other hand, if the metal of that portion is not removed daringly, an advantage that the mechanical strength is conversely increased is obtained.

FIGS. 12A to 12D are sectional views showing a manufacture process of an electro-optic modulation device according to another embodiment of the present invention.

Figure 12A:
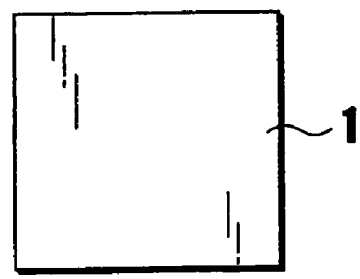
FIGS. 12A to 12D are sectional views showing a manufacture process of an electro-optic modulation device according to another embodiment of the present invention.
Figure 12B:
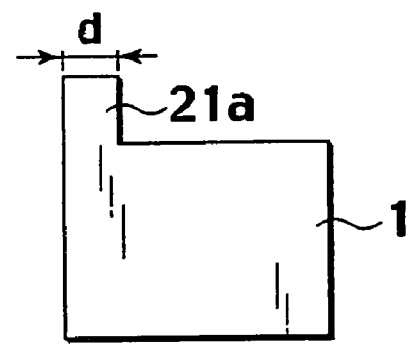
Figure 12C:
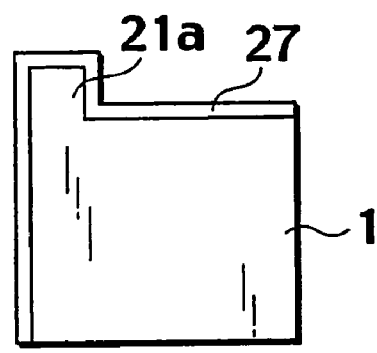
Figure 12D:
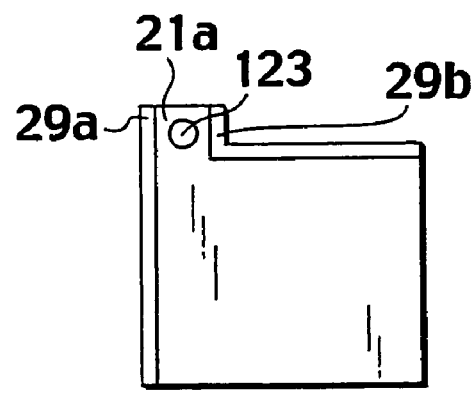

The electro-optic modulation device according to the embodiment shown in FIGS. 12A to 12D finally includes a ridge portion 21*a* formed on one end of the top surface of the electro-optic crystal 1 so as to project with a predetermined width d or less, for example, with 0.1 mm or less, and a pair of electrodes 29*a* and 29*b* formed on a pair of side faces opposed to each other in the width direction of the ridge portion 21*a*, as shown in FIG. 12D.

In order to manufacture the electro-optic modulation device having such a structure, the top surface of the electro-optic crystal 1 of the raw material shown in FIG. 12A is first cut or polished as shown in FIG. 12B to form the ridge portion 21*a* having a width equal to a predetermined width d or less, for example, 0.1 mm or less.

Then, as shown in FIG. 12C, metal 27 is deposited by evaporation or applied to the top surface of the electro-optic crystal 1 having the formed ridge portion 21 and a side face on which the ridge portion 21a is formed inclusive of the ridge portion 21a. Subsequently, as shown in FIG. 12D, only the metal 27 deposited on the ridge portion 21a by evaporation is removed by polishing or the like. As a result, the pair of electrodes 29a and 29b are formed with metal left on both side faces of the ridge portion 21a.

Even if the electro-optic modulation device having such a configuration is formed so as to have an extremely small distance between the pair of electrodes 29a and 29b, the electrodes 29a and 29b are formed on the projected portion of the electro-optic crystal 1 which is large as a whole in the same way as the embodiment shown in FIG. 10D. Therefore, the electro-optic crystal between the electrodes 29a and 29b is not easily broken. In addition, the electrodes 29a and 29b are formed by conducting working and metal evaporation on the top surface of the electro-optic crystal 1. Therefore, it is not difficult to conduct working so as to make the distance d between the electrodes 29a and 29b located across the ridge portion 21a extremely thin, for example, 0.1 mm or less.

As shown in FIG. 12D, a spot beam 123 is incident from an end face of the electro-optic crystal 1 between the electrodes 25a and 25b. As for antireflection coating on the plane of incidence as well, it can be conducted extremely easily and certainly by applying the antireflection coating to not only the end face of the thin crystal portion between the electrodes 29a and 29b, but also on an end face of the whole electro-optic modulation device including the end face of the electro-optic crystal 1 formed as one body below the portion. By the way, in the electro-optic modulation device having such a configuration, the direction of an electric-field vector generated by the electrodes 29a and 29b is perpendicular to the opposed planes of the electrodes 29a and 29b.

As shown in FIG. 12D, only the metal 27 deposited on the ridge portion 21a by evaporation is removed by polishing or the like, and the pair of electrodes 29a and 29b are formed of the metal left on both side faces of the ridge portion 21a. In this case, the metal 27 remains on the top surface of the electro-optic crystal 1 and on side faces besides the side faces opposed to each other across the ridge portion 21a and this portion also acts as electrodes. However, undesired electric fields generated between electrodes of this portion are extremely few, and a large majority is generated between the opposed electrodes 29a and 29b on the ridge portion 21a.

If in this case as well metal 27 remaining on the top surface of the electro-optic crystal 1 and on side faces besides the side faces opposed to each other across the ridge portion 21a is removed, generation of unnecessary electric fields can be avoided in the same way as the case shown in FIG. 11.

If it is attempted to increase the length L to obtain a large phase modulation depth and a large electric-field sensitivity in the embodiments shown in FIGS. 10D, 11 and 12D, the light diffraction effect becomes an obstacle. In other words, when L is small, light is emitted from the end face of the electro-optic crystal even if it is it diffracted and consequently there is no light loss. When L is made large, diffracted light proceeds in such a direction as to get out of the ridge portion 21 (21a).

In the electro-optic modulation devices shown in FIGS. 10D, 11 and 12D, the top surface of the ridge portion 21 (21a) is in contact with air and both side faces are in contact with the electrodes. At these faces, therefore, reflection takes place and consequently light does not leak.

Since the electro-optic crystal 1 which is the same as the ridge portion 21 (21a) is present under the ridge portion 21 (21a), however, light leakage from the ridge portion 21 (21a) occurs. If the length of the electro-optic crystal is lengthened, therefore, a large phase modulation depth and a large electric-field sensitivity corresponding to the length cannot be obtained.

Hereafter, an embodiment that provides a large phase modulation depth and a large electric-field sensitivity corresponding to the length even when the length of the electro-optic crystal is lengthened in the electro-optic modulation devices shown in FIGS. 10D, 11 and 12D will be described.

FIG. 13 is a diagram showing a plane of light incidence of an electro-optic modulation device according to an embodiment of ridge type.

The electro-optic modulation device according to this embodiment includes electro-optic crystal 61 changed in birefringence index by electric-field coupling, and a low refractive index medium 62 having a refractive index that is less than the refractive index of the electro-optic crystal 61. It is desirable that the refractive index of the low refractive index medium 62 is lower than that of the electro-optic crystal 61 by at least approximately 10%. For example, if the refractive index of the electro-optic crystal 61 is 3, the refractive index of the low refractive index medium 62 should be 2.7 or less. In general, the larger the difference in refractive index between the electro-optic crystal 61 and the low refractive index medium 62 becomes, the more desirable. The electro-optic crystal 61 is formed of, for example, GaAs (gallium arsenide), InP (indium phosphide), CdTe (cadmium telluride) or ZnTe (zinc telluride).

Furthermore, the electro-optic modulation device according to the embodiment includes a base portion 63, a ridge portion 64 formed thinly (for example, so as to have a thickness of approximately d=0.1 mm) on a top surface 63a of the base portion 63 so as to include at least the electro-optic crystal 61 and have a top surface 61a exposed to the open air (such as the air), and electrodes 65a and 65b each having an L-shaped section that extends over opposed side faces 64a and 64b of the ridge portion 64 and the top surface 63a of the base portion 63. The electro-optic crystal 61 is sandwiched between the open air above the top surface 61a and the low refractive index medium 62.

In the electro-optic modulation device according to this embodiment, the L-shaped electrodes 65a and 65b are provided so as to extend over the side faces 64a and 64b and the top surface 63a of the base portion 63. As compared with the case where the electrodes 65a and 65b are provided respectively on the side faces 64a and 64b, therefore, the mechanical strength is improved. For example, the possibility of the base portion 63 and the ridge portion 64 being separated from each other or a part of the ridge portion 64 being damaged can be reduced.

If light incident from a beam spot BS of the electro-optic crystal 61 is diffracted, for example, upward (in the positive y-direction) in the electro-optic modulation device according to the embodiment, the light is reflected by the open air above the top surface 61a and returned into the electro-optic crystal 61. If light is diffracted, for example, downward (in the negative y-direction), the light is reflected by the low refractive index medium 62 and returned into the electro-optic crystal 61. At the electrodes 65a and 65b as well, reflection takes place in the same way. In other words, an optical waveguide is constructed in the electro-optic modulation device according to the embodiment. At this time, the electro-optic crystal 61 is equivalent to a core in the optical waveguide, and the low refractive index medium 62 is equivalent to a clad in the optical waveguide. Thus, in the electro-optic modulation device according to the embodiment, light can be trapped in the electro-optic crystal 61. Even if the length of the electro-optic crystal 61 in the z-direction is lengthened, therefore, it is possible to prevent diffracted light from being leaked. As a result, a large phase modulation depth and a large electric-field sensitivity can be obtained.

Especially, in an example shown on the left side in FIG. 13, the base portion 63 is formed of the low refractive index medium 62 and the ridge portion 64 is formed of the electro-optic crystal 61. As compared with an example shown in the center and an example shown on the right side described later, therefore, the structure can be simplified and consequently the manufacture of the electro-optic modulation device is facilitated. For example, it is facilitated to manufacture the base portion 63 and the ridge portion 64 separately and couple them later. Unlike the example shown in the center and described later, a projection is not formed in the low refractive index medium 62 and the possibility of damage in the base portion 63 and the ridge portion 64 can be made low.

In the example shown in the center of FIG. 13, a lower part of the ridge portion 64 is formed of the low refractive index medium 62. If the refractive index of the low refractive index medium 62 is not so small as compared with the refractive index of the electro-optic crystal 61, oozing out of light into the low refractive index medium 62 becomes comparatively large. In this example, the electric field is coupled to the light that has oozed out, as well. If the low refractive index medium 62 forming the lower part of the ridge portion 64 has an electro-optic effect, therefore, the detection sensitivity can be made high. Furthermore, unlike the left side example and the right side example in which the electrodes 65a and 65b do not face the light that has oozed out, the sensitivity is not lowered in this example.

In the example shown on the right side in FIG. 13, an upper part of the base portion 63 is formed of the electro-optic crystal 61, and consequently the electro-optic crystal 61 becomes large. In particular, the projection area from the upward becomes large. As compared with the left side example and the center example, therefore, the mechanical strength of the electro-optic modulation device can be increased. For improving the sensitivity, the ridge portion is formed as thin as possible. In the right side example, the electro-optic crystal 61 forming the ridge portion 64 becomes large as a whole and consequently it becomes easy to handle the ridge portion 64. For example, therefore, the work of conducting antireflection coating on the end face of the electro-optic crystal 61 is facilitated.

By the way, it is also possible to use photonic crystal having a periodic structure instead of the low refractive index medium 62 according to the embodiment. The photonic crystal is a generic term of materials having a periodic structure of a light wavelength order. The photonic crystal has a property of preventing light from entering a region having a periodic structure.

Figure 14A:
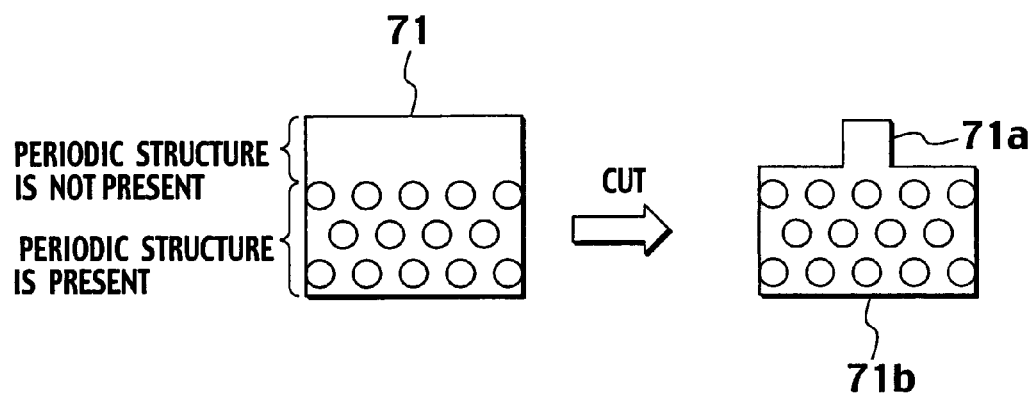
FIGS. 14A and 14B are diagrams showing a ridge electro-optic modulation device using photonic crystal.

When using a medium formed of photonic crystal 71 as shown in FIG. 14A, it is possible to construct an electro-optic modulation device including a ridge portion 71a formed of a region having no periodic structure and a base portion 71b formed of a region having a periodic structure by conducting cutting working on electro-optic crystal including a region having no periodic structure and a region having a periodic structure.

Figure 14B:
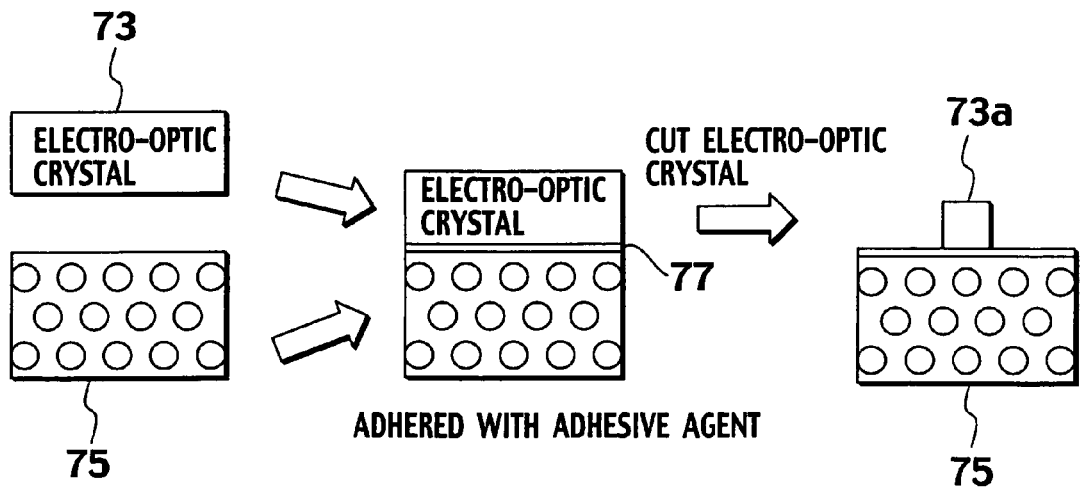

An electro-optic modulation device may be constructed by adhering electro-optic crystal 73 and photonic crystal 75 having a periodic structure to each other with an adhesive agent 77 as shown in FIG. 14B and then cutting the electro-optic crystal 73.

FIG. 15 is a diagram showing a plane of light incidence of an electro-optic modulation device according to another embodiment of ridge type.

In the electro-optic modulation device according to this embodiment, kinds of chemical elements included in the low refractive index medium in the embodiment described earlier are made the same as kinds of chemical elements included in the electro-optic crystal, and refractive indexes are made different from each other according to a difference in composition ratio of the chemical elements. Other configurations and differences among examples, operation and effects are not different from those of the electro-optic modulation device in the above-described embodiment, and consequently description of them will be omitted.

In the electro-optic modulation device according to this embodiment, kinds of chemical elements included in the low refractive index medium in the embodiment described earlier are made the same as kinds of chemical elements included in the electro-optic crystal. By only changing the composition ratio of the chemical elements after forming the low refractive index medium in the crystal growth process, therefore, the electro-optic crystal can be formed continuously. As a result, integral electro-optic crystal 61A including a high refractive index layer and a low refractive index layer is obtained. As compared with the case where the electro-optic crystal and the low refractive index medium are manufactured separately and coupled, manufacture is facilitated. Furthermore, thickness adjustment of the low refractive index medium and the electro-optic crystal can be conducted easily. Furthermore, since a boundary plane between the low refractive index medium and the electro-optic crystal can be made similar to an ideal plane, light leak can be reduced as compared with the case where there are a large number of concavities and convexities on this boundary plane.

FIG. 16 is a diagram showing a plane of light incidence of an electro-optic modulation device according to another embodiment of ridge type.

The electro-optic modulation device according to this embodiment includes electro-optic crystal 61, and an adhesive agent 62a serving as a low refractive index medium having a refractive index that is less than the refractive index of the electro-optic crystal 61.

The electro-optic modulation device according to this embodiment includes a base portion 63, a ridge portion 64 formed thinly on a top surface 63a of the base portion 63 so as to include at least the electro-optic crystal 61 and have a top surface 61a exposed to the open air, and L-shaped electrodes 65a and 65b each of which extends over opposed side faces 64a and 64b of the ridge portion 64 and the top surface 63a of the base portion 63. The electro-optic crystal 61 is formed to be sandwiched between the open air above the top surface 61a and the adhesive agent 62a.

In the electro-optic modulation device according to this embodiment as well, the L-shaped electrodes 65a and 65b are provided so as to extend over the side faces 64a and 64b and the top surface 63a of the base portion 63. As compared with the case where the electrodes 65a and 65b are provided respectively only on the side faces 64a and 64b, therefore, the mechanical strength is improved.

In the electro-optic modulation device according to this embodiment as well, an optical waveguide is constructed, and consequently light can be trapped in the electro-optic crystal 61. By lengthening the length of the electro-optic crystal 61, therefore, it becomes possible to obtain a large phase modulation depth and a large electric-field sensitivity corresponding to the length.

Furthermore, the substrate 66a and the electro-optic crystal 61 can be coupled by using the adhesive agent 62a.

In an example shown on the left side in FIG. 16, the base portion 63 is formed of the substrate 66 and the adhesive agent 62*a* disposed above the substrate 66, and the ridge portion 64 is formed of the electro-optic crystal 61. As a result, the area of contact with the electrodes 65*a* and 65*b* becomes wide. Therefore, the electrodes 65*a* and 65*b* can be fixed firmly. Furthermore, it becomes unnecessary to use another adhesive agent to fix the electrodes 65*a* and 65*b*.

In the example shown in the center of FIG. 16, the base portion 63 is formed of the substrate 66, and a lower part of the ridge portion 64 is formed of the adhesive agent 62*a*. Therefore, operation and effects similar to those in the example shown in the center in another embodiment are obtained.

In the example shown on the right side in FIG. 16, the base portion 63 is formed of the substrate 66, the adhesive agent 62*a* disposed above the substrate 66, and the electro-optic crystal 61 disposed above the adhesive agent 62*a*, and the ridge portion 64 is formed of the electro-optic crystal 61. Therefore, operation and effects similar to those in the example shown in the right side in another embodiment are obtained.

In the above-described embodiments, the low refractive index medium 62 or the adhesive agent 62*a* are provided on the bottom surface of the electro-optic crystal 61 which is one of surfaces that extend along the path of light, and the top surface 61*a* is exposed to the open air. Alternatively, the electro-optic crystal 61 may be sandwiched between low refractive index media by providing a low refractive medium on the top surface 61*a* as well.

Figure 17A:
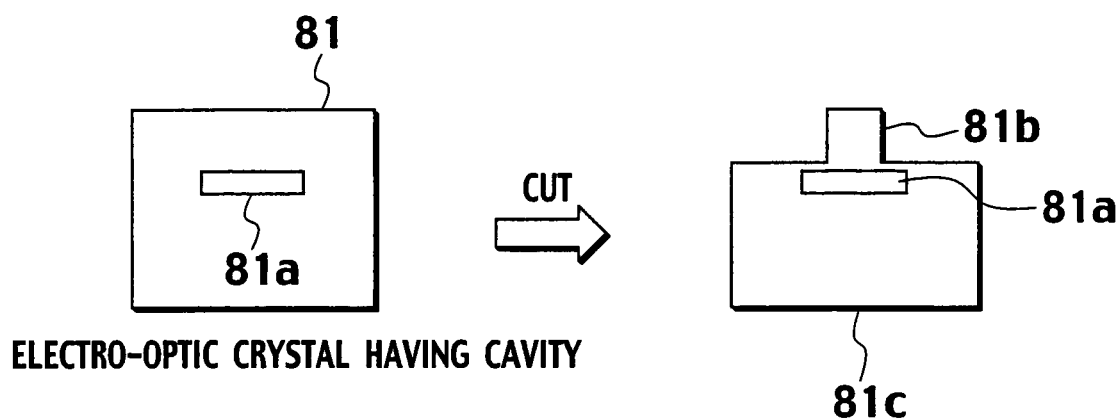
FIGS. 17A and 17B are diagrams showing a plane of light incidence of an electro-optic modulation device according to another embodiment of ridge type.
Figure 17B:
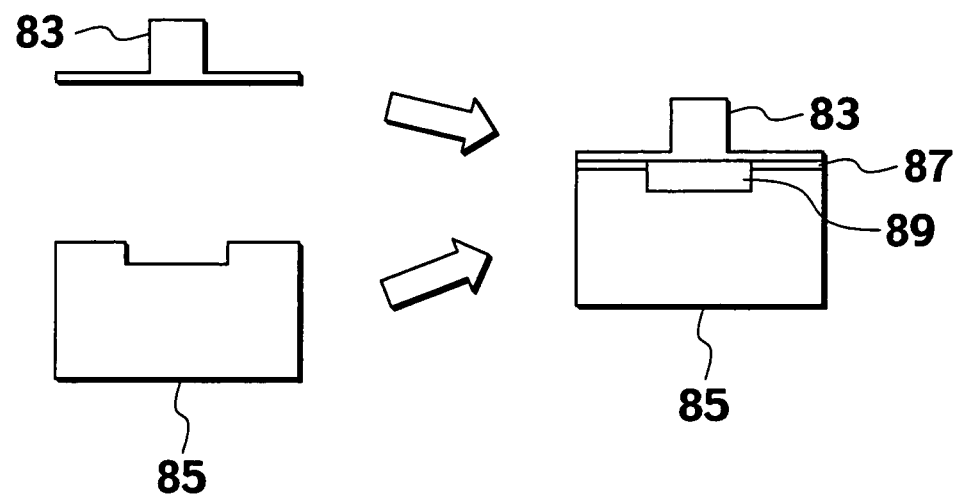

FIGS. 17A and 17B are diagrams showing a manufacture method of an electro-optic modulation device according to another embodiment of ridge type.

In this embodiment, an electro-optic modulation device having a cavity 81*a* under a ridge portion 81*b* may be constructed by, for example, cutting electro-optic crystal 81 having the cavity 81*a* formed by the crystal growth process as shown in FIG. 17A.

Furthermore, as shown in FIG. 17B, an electro-optic modulation device having a cavity 89 under a ridge portion may be constructed by adhering electro-optic crystal 83 having the ridge portion formed therein previously and a base portion 85 having a hollow formed in its top portion to each other by means of an adhesive agent 87.

As gas having a refractive index lower than the refractive index of the electro-optic crystal, for example, air or gas can be sealed in these cavities 81*a* and 89. It is possible to cause the open air to flow into and out of these cavities 81*a* and 89. These cavities 81*a* and 89 can be made vacuous.

In the above-described embodiment, an example premised on the case shown in FIG. 10D has been mentioned. As a matter of course, the embodiment can be applied to the case shown in FIG. 11. In addition, the embodiment can be applied to the case shown in FIG. 12D as well in the same way. Since they are self-evident to those skilled in the art, description of concrete examples with reference to drawings will be omitted.

An embodiment of an electro-optic modulation device relating to a configuration in which the frequency characteristics become flat will now be described.

In an electro-optic modulation device including electro-optic crystal and a pair of electrodes with the electro-optic crystal sandwiched therebetween, the electro-optic crystal is distorted mainly in a direction perpendicular to the electrode plane, and consequently flatness in frequency characteristics can not be obtained. Hereafter, therefore, several embodiments in which the distortion of the electro-optic crystal is reduced by wax or the like will be described.

FIGS. 18A to 18E are diagrams showing how wax is applied to electro-optic crystal placed longitudinally on a pedestal 19.

FIG. 18A shows the case where wax 37 is applied so as to heap both electrodes 33 and 35 with the wax 37 from a top surface of the electro-optic crystal 31 and in addition heap the pedestal 19 as well with the wax 37. According to this aspect, the distortion of the electro-optic crystal 31 can be suppressed certainly. FIG. 18B shows the case where wax 37 is applied so as to heap one electrode 33 with the wax 37 from a top surface of the electro-optic crystal 31 and in addition heap the pedestal 19 as well with the wax 37. In this case as well, the distortion of the electro-optic crystal 31 can be suppressed comparatively certainly. As a matter of course, the electrode 35 side may be heaped with the wax 37. FIG. 18C shows the case where wax 37 is applied so as to heap a pedestal 19 with the wax from both electrodes 33 and 35. By thus fixing the electrodes 33 and 35 to the pedestal 19 by means of the wax 37, distortion of the electro-optic crystal 31 can be suppressed relatively. FIG. 18D shows the case where wax 37 is applied so as to heap the top surface of the electro-optic crystal 31 with the wax 37. If the electrodes 33 and 35 are thus fixed to the electro-optic crystal 31, distortion of the electro-optic crystal 31 can be suppressed. FIG. 18E shows the case where wax 37 is applied so as to heap the top surface of the electro-optic crystal 31 and top end portions of the both electrodes 33 and 35 with the wax 37. In this case as well, distortion of the electro-optic crystal 31 can be suppressed in the same way as the case shown in FIG. 18D. By the way, wax is not applied to a beam spot BS or the surface of the beam spot. This aims at preventing an optical beam from being diffracted by wax.

Which of the above-described aspects is selected depends upon the viewpoint of tradeoff between the degree of the frequency flatness and the degree of the electro-optic effect. In other words, in the aspect shown in FIG. 18A, distortion of the electro-optic crystal 31 can be suppressed certainly, but there is a drawback that the electro-optic effect falls somewhat. On the other hand, in the aspect shown in FIG. 18D, distortion of the electro-optic crystal 31 cannot be suppressed so much as compared with the aspect shown in FIG. 18A, but the electro-optic effect cannot fall so much.

Figure 19:
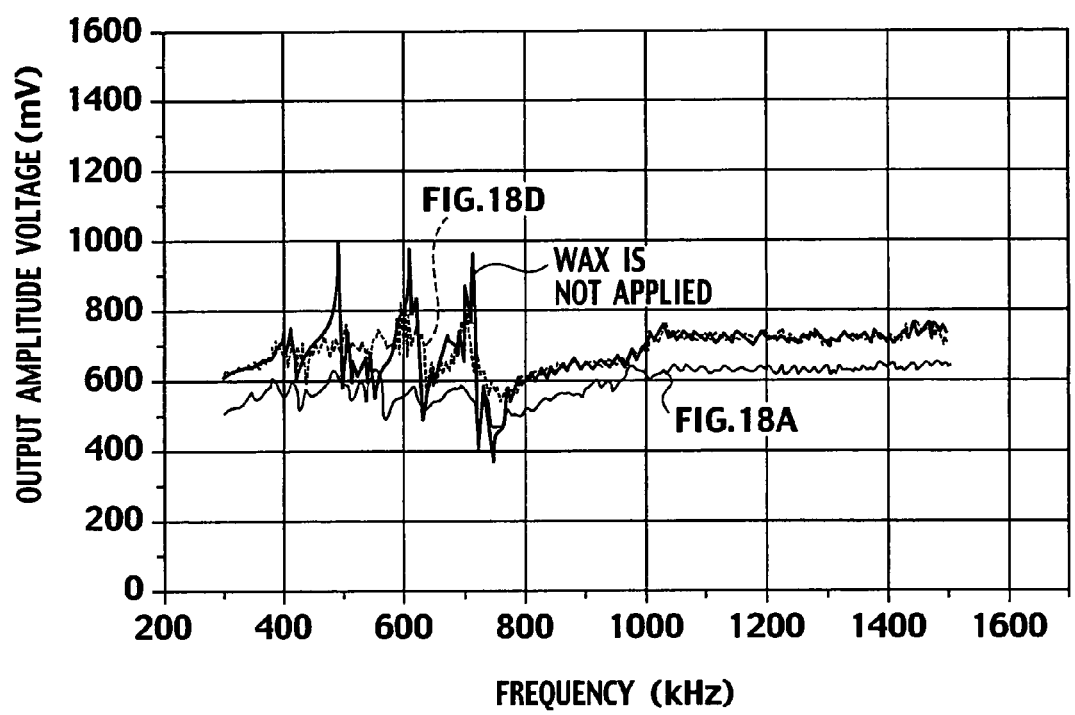
FIG. 19 is a diagram showing differences in output characteristics of an electric-field sensor among the case where wax is not applied to electro-optic crystal, the case where wax is applied to a top surface of the electro-optic crystal, and the case where wax is applied from the top surface of the electro-optic crystal to both electrodes, and further to a pedestal.

FIG. 19 is a diagram showing differences in output characteristics of an electric-field sensor among the case where wax is not applied to the electro-optic crystal, the case where the top surface of the electro-optic crystal 31 is heaped with wax 37 as shown in FIG. 18D, and the case where both electrodes 33 and 35 and further the pedestal 19 are heaped with wax 37 from the top surface of the electro-optic crystal 31.

In the electric-field sensor having the configuration shown in FIG. 1, it is desirable that the amplitude voltage (output amplitude voltage) of the output signal 122 is flat. In the case where electro-optic crystal 31 of a certain kind is used and the wax 37 is not applied to the electro-optic crystal 31, however, resonance is found near 590 kHz, near 610 kHz and near 720 kHz. If the wax 37 is applied to the top surface of the electro-optic crystal 31 as shown in FIG. 18D, however, resonance can be reduced while maintaining the output amplitude voltage. Furthermore, if the wax 37 is applied to the top surface of the electro-optic crystal 31 and both the electrodes 33 and 35 as shown in FIG. 18A, resonance can be eliminated although the output amplitude voltage becomes low.

FIGS. 20A to 20E are diagrams showing how wax is applied to electro-optic crystal placed laterally on the pedestal 19.

FIG. 20A shows the case where the wax 37 is applied so as to heap both side faces of the electro-optic crystal 31 with the wax 37 from an electrode 33 disposed on the electro-optic crystal 31 and further heap the pedestal 19 as well with the wax 37. According to this aspect, the distortion of the electro-optic crystal 31 can be suppressed certainly. FIG. 20B shows the case where wax 37 is applied so as to heap one of the side faces of the electro-optic crystal 31 with the wax 37 from a top surface of the electrode 33 and in addition heap the pedestal 19 as well with the wax 37. In this case as well, the distortion of the electro-optic crystal 31 can be suppressed comparatively certainly. As a matter of course, the other side face of the electro-optic crystal 31 may be heaped with the wax 37. FIG. 20C shows the case where wax 37 is applied so as to heap the pedestal 19 with the wax from both side faces of the electro-optic crystal 31. In this case, the electro-optic crystal 31 can be fixed to both the electrodes 33 and 35, and can be further fixed to the pedestal 19 as well. Therefore, distortion of the electro-optic crystal 31 can be suppressed comparatively certainly. FIG. 20D shows the case where wax 37 is applied so as to heap both side faces of the electro-optic crystal 31 with wax 37 from an end portion of the electrode 33 and heap the pedestal 19 with the wax 37 from both side faces of the electro-optic crystal 31. In this case as well, the effect can be obtained in the same way as the case shown in FIG. 20C. FIG. 20E shows the case where wax 37 is applied so as to heap both side faces of the electro-optic crystal 31 with the wax 37. Since the electro-optic crystal 31 is fixed to both electrodes 33 and 35 by the wax 37, distortion of the electro-optic crystal 31 can be suppressed. By the way, wax is not applied to a beam spot BS or the surface of the beam spot. This aims at preventing an optical beam from being diffracted by wax.

In the description of FIGS. 18A to 18E and 20A to 20E, wax is applied. However, the applied material is not restricted to wax, but another insulator may be used.

Figure 21A:
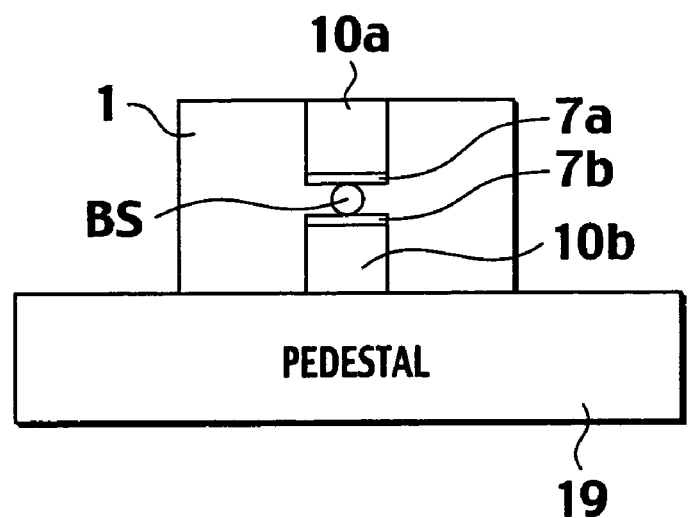
FIGS. 21A and 21B are diagrams showing how wax is applied to an electro-optic modulation device of the so-called H-type.
Figure 21B:
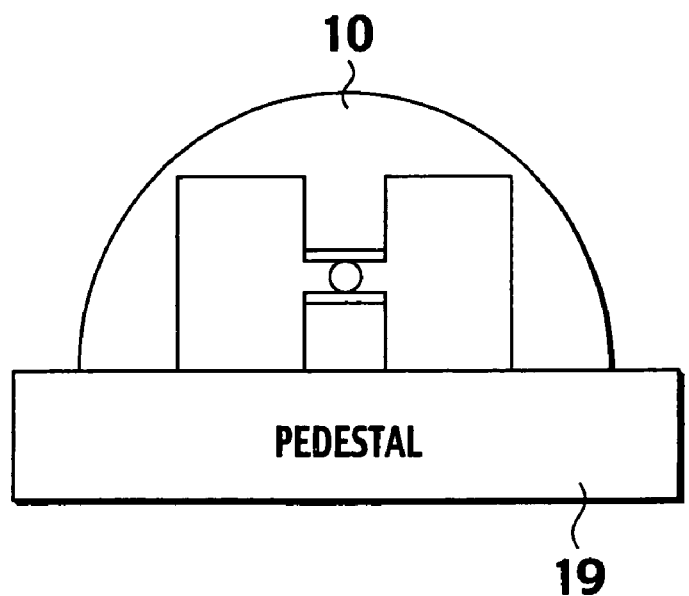

FIGS. 21A and 21B are diagrams showing how wax is applied to an electro-optic modulation device of the above-described so-called H-type.

In an aspect shown in FIG. 21A, the insulators 9a and 9b in the electro-optic modulation device of H-type shown in FIGS. 5A and 5B are specifically replaced by wax 10a and 10b. In other words, electrodes 7a and 7b are formed with a central thin crystal portion sandwiched therebetween in grooves 3a and 3b of the electro-optic crystal 1 placed on the pedestal 19 in the same way as the embodiment shown in FIGS. 5A and 5B. Unlike the embodiment shown in FIGS. 5A and 5B, however, wax 10a and 10b are embedded in remaining groove portions as a concrete example of the insulators 9a and 9b.

According to such the aspect, the central thin crystal portion is completely surrounded and fixed by the electrodes 7a and 7b, wax 10a and 10b, and other electro-optic crystal. Therefore, distortion of the thin crystal portion sandwiched between the electrodes 7a and 7b can be suppressed. By the way, the aspect shown in FIG. 21 further has an effect of complementing the physical strength of the central thin crystal portion in the same way as the aspect shown in FIGS. 5A and 5B.

In an aspect shown in FIG. 21B, the whole of the electro-optic modulation device of H-type inclusive of the grooves 3a and 3b of the electro-optic crystal 1 is covered by wax 10, and the electro-optic modulation device is fixed to the pedestal 19 by the covering wax 10. According to such an aspect as well, it is a matter of course that the distortion of the central thin crystal portion can be suppressed and its physical strength can be complemented. The applied material is not restricted to the wax 10, but another insulator may be used.

Figure 22A:
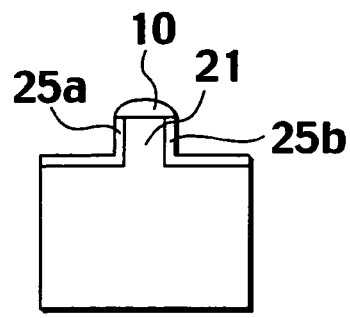
FIGS. 22A to 22C are diagrams showing how wax is applied to an electro-optic modulation device of the so-called ridge type.
Figure 22B:
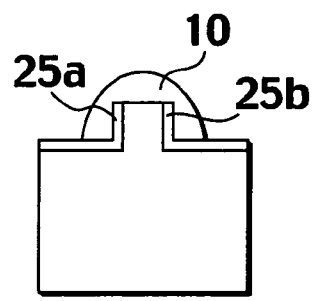
Figure 22C:
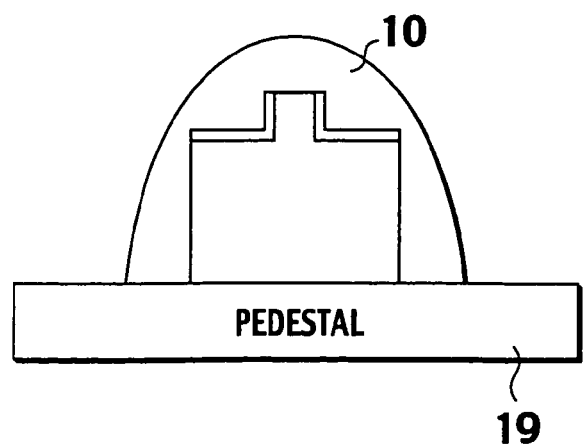

FIGS. 22A to 22C are diagrams showing how wax is applied to an electro-optic modulation device of the so-called ridge type.

In an aspect shown in FIG. 22A, wax 10 is applied to a top surface of the ridge portion 21 including electrodes of the electro-optic modulation device of ridge type shown in FIG. 10D. According to such an aspect, the ridge portion 21 and the electrodes 25a and 25b can be fixed. Therefore, the distortion of the crystal in the ridge portion 21 can be suppressed.

In an aspect shown in FIG. 22B, the whole of the ridge portion 21 and the electrodes 25a and 25b of the electro-optic modulation device of ridge type shown in FIG. 10D is covered by wax 10. According to such an aspect as well, the ridge portion 21 and the electrodes 25a and 25b can be fixed. Therefore, the distortion of the crystal in the ridge portion 21 can be suppressed.

Furthermore, in the aspect shown in FIG. 22B, the whole of the electro-optic modulation device of ridge type shown in FIG. 10D is covered by wax 10 and fixed to the pedestal 19. It is a matter of course that in this case well distortion of the crystal in the ridge portion 21 can be suppressed.

Which of the aspects shown in FIGS. 22A to 22C is selected depends upon the viewpoint of tradeoff between the degree of the frequency flatness and the degree of the electro-optic effect in the same way as the cases shown in FIGS. 18A to 18E.

In the description of FIGS. 22A to 22E, the ridge portion and so on is covered by wax. However, the ridge portion and so on may be covered by another insulator.

It is a matter of course that the aspects shown in FIGS. 22A to 22C can also be applied to the electro-optic modulation device of the so-called L-type shown in FIG. 12D.

In the above-described embodiments, a matter having viscosity and the property of becoming hard with the lapse of time is applied to the electro-optic crystal, as heretofore described. Therefore, the matter that has become hard reduces deformation of the crystal lattice. As a result, an electro-optic modulation device free from resonance and having flatter frequency characteristics is obtained.

In the present embodiment, the matter having viscosity and the property of becoming hard with the lapse of time is used. If it is a matter that has viscosity of such a degree that at least its shape is not changed when applied to electro-optic crystal, it is suitable because its shape is maintained even if the matter is applied so as to take a desired shape and then left as it is.

Wax becomes hard by evaporation of moisture with elapse of time. Alternatively, a matter that becomes low in temperature and consequently becomes hard with the lapse of time, i.e., a matter preheated so as to have viscosity may be used. An adhesive agent may be used.

INDUSTRIAL APPLICABILITY

According to the present invention, the electro-optic crystal includes grooves formed respectively on one pair of side faces that are parallel to a direction of light incident between a pair of electrodes, so as to become parallel to the direction, and consequently a thin crystal portion sandwiched between the grooves serves as a portion for coupling the electric field. The grooves are filled with one pair of electrodes, or filled with one pair of electrodes and insulators. Therefore, the electro-optic crystal is not easily broken from the thin crystal portion between the electrodes. In addition, it is not difficult to work the electro-optic crystal between the electrodes so as to make it extremely thin. In addition, antireflection coating can be conducted extremely easily and certainly by applying the antireflection coating to not only an end face of the thin crystal portion between the electrodes, but also on an end face of the whole electro-optic modulation device including the end face of the electro-optic crystal except the crystal portion. This results in an effect that the thin crystal portion is not distorted and the frequency characteristics become flat.

According to the present invention, a ridge portion having a width shorter than a predetermined width projected on one side face of a base portion is formed as electro-optic crystal coupled to electric field. Therefore, a thin crystal portion between the electrodes is not easily broken. In addition, it is not difficult to conduct working so as to make the ridge portion between the electrodes extremely thin, for example, 0.1 mm or less. As for antireflection coating on the plane of incidence as well, it can be conducted extremely easily and certainly by generally applying the antireflection coating to not only the end face of the thin crystal portion between the electrodes, but also on an end face of the whole electro-optic modulation device including the end face of the electro-optic crystal integrally formed under the crystal portion.

If in this case at least the top surface of the ridge portion and side faces of one pair of electrodes forming faces continuous to the top surface are covered by an insulator, distortion of the electro-optic crystal in the ridge portion is suppressed and flat frequency characteristics are obtained.

Furthermore, if in this case at least the refractive index of a boundary portion between the ridge portion and the base portion is made lower than the refractive index of the electro-optic crystal in the ridge portion, it is possible to prevent diffracted light from leaking even when the length of the electro-optic crystal is lengthened. Therefore, a large phase modulation depth can be obtained.

Furthermore, according to the present invention, an insulator is applied so as to relatively fix the electro-optic crystal and one pair of electrodes. Therefore, distortion of the electro-optic crystal is suppressed and flat frequency characteristics are obtained.

The invention claimed is:

1. An electro-optic modulation device that includes an electro-optic crystal having a birefringence index changed by a coupled electric field, and one pair of electrodes disposed so as to have the electro-optic crystal interposed therebetween to couple the electric field to the electro-optic crystal, and that changes polarization of light incident between the one pair or electrodes according to a change of the birefringence index depending upon a strength of electric field coupled via the one pair of electrodes, the electro-optic modulation device comprising:
   a base portion having a top surface;
   a ridge portion projecting from the top surface and extending in a direction of the incident light, at least a part of the ridge portion comprising the electro-optic crystal, the ridge portion having a width equivalent to a predetermined value or less; and
   an insulator which covers the whole device,
   wherein the electrodes are formed on one pair of side faces opposed in a width direction of the ridge portion and on the whole top surface adjacent to the side faces.

2. An electro-optic modulation device that includes an electro-optic crystal having a birefringence index changed by a coupled electric field, and one pair of electrodes disposed so as to have the electro-optic crystal interposed therebetween to couple the electric field to the electro-optic crystal, and that changes polarization of light incident between the one pair of electrodes according to a change of the birefringence index depending upon a strength of electric field coupled via the one pair of electrodes, the electro-optic modulation device comprising:
   a base portion having a top surface; and
   a ridge portion projecting from the top surface and extending in a direction of the incident light, at least a part of the ridge portion comprising the electro-optic crystal, the ridge portion having a width equivalent to a predetermined value or less,
   wherein the electrodes are formed on one pair of side faces opposed in a width direction of the ridge portion and on the whole top surface adjacent to the side faces, and an insulator covers the ridge portion and at least parts of the electrodes, formed on the top surface.

3. An electro-optic modulation device that includes an electro-optic crystal having a birefringence index changed by a coupled electric field, and one pair of electrodes disposed so as to have the electro-optic crystal interposed therebetween to couple the electric field to the electro-optic crystal, and that changes polarization of light incident between the one pair of electrodes according to a change of the birefringence index depending upon a strength of electric field coupled via the one pair of electrodes, the electro-optic modulation device comprising:
   a base portion having a top surface; and
   a ridge portion projecting from the top surface and extending in a direction of the incident light, at least a part of the ridge portion comprising the electro-optic crystal, the ridge portion having a width equivalent to a predetermined value or less,
   wherein the electrodes are formed on one pair of side faces opposed in a width direction of the ridge portion and on the whole top surface adjacent to the side faces, and an insulator covers a top surface of the ridge portion and side faces of the one pair of electrodes which are continuous with the top surface of the ridge portion.

4. The electro-optic modulation device according to claim 1, wherein the insulator comprises wax.

* * * * *